United States Patent
Daniel et al.

(10) Patent No.: US 11,980,976 B2
(45) Date of Patent: May 14, 2024

(54) METHOD FOR A WELDING SEQUENCER

(71) Applicant: Lincoln Global, Inc., Santa Fe Springs, CA (US)

(72) Inventors: Joseph Daniel, Sagamore Hills, OH (US); Michael Didion, Sheffield Village, OH (US); Edward Enyedy, Eastlake, OH (US); Daniel Fleming, Painesville, OH (US); James Hearn, Brunswick, OH (US)

(73) Assignee: LINCOLN GLOBAL, INC., City Of Industry, CA (US)

( * ) Notice: Subject to any disclaimer, the term of this patent is extended or adjusted under 35 U.S.C. 154(b) by 621 days.

(21) Appl. No.: 17/128,685

(22) Filed: Dec. 21, 2020

(65) Prior Publication Data

US 2021/0107084 A1    Apr. 15, 2021

Related U.S. Application Data

(60) Division of application No. 15/948,357, filed on Apr. 9, 2018, now Pat. No. 10,940,555, which is a
(Continued)

(51) Int. Cl.
  B23K 9/095    (2006.01)
  B23K 9/10    (2006.01)
  (Continued)

(52) U.S. Cl.
  CPC .......... B23K 9/0956 (2013.01); B23K 9/0953 (2013.01); B23K 9/1043 (2013.01);
  (Continued)

(58) Field of Classification Search
  CPC .. B23K 9/0956; B23K 9/0953; B23K 9/1043; B23K 9/173; G05B 19/4183;
  (Continued)

(56) References Cited

U.S. PATENT DOCUMENTS

| 1,159,119 A | 11/1915 | Springer |
| D140,630 S | 3/1945 | Garibay |

(Continued)

FOREIGN PATENT DOCUMENTS

| CA | 2698078 A1 | 9/2011 |
| CH | 688034 A5 | 4/1997 |

(Continued)

OTHER PUBLICATIONS

International Search Report and Written Opinion from PCT/US07/15014 dated Mar. 11, 2008.
(Continued)

*Primary Examiner* — Phuong T Nguyen
(74) *Attorney, Agent, or Firm* — Brad C. Spencer

(57) ABSTRACT

The invention described herein generally pertains to a system and method for evaluating one or more conditions or preliminary weld condition related to a welding system and/or method that utilizes a welding sequence to perform two or more welds with respective welding schedules. In an embodiment, an operator registration is provided that verifies the operator and identifies welding sequences to which the operator is authorized to perform. In another embodiment, one or more fixture locations are monitored to determine whether a workpiece is accurately configured prior to a welding operation. In still another embodiment, locations on a workpiece can be displayed to assist an operator in performing two or more welds utilizing a welding sequence. Moreover, a wireless system communications a data signal to a welding work cell in which such data is used to identify a welding sequence.

19 Claims, 12 Drawing Sheets

Related U.S. Application Data continuation of application No. 13/802,951, filed on Mar. 14, 2013, now Pat. No. 9,937,577, which is a continuation-in-part of application No. 11/613,652, filed on Dec. 20, 2006, now Pat. No. 9,104,195.

(51) Int. Cl.
  *B23K 9/173* (2006.01)
  *G05B 19/418* (2006.01)

(52) U.S. Cl.
  CPC .......... *B23K 9/173* (2013.01); *G05B 19/4183* (2013.01); *G05B 2219/24162* (2013.01); *G05B 2219/31027* (2013.01); *G05B 2219/31048* (2013.01); *G05B 2219/45134* (2013.01); *Y02P 90/02* (2015.11)

(58) Field of Classification Search
  CPC ........... G05B 2219/24162; G05B 2219/31027; G05B 2219/31048; G05B 2219/45134; Y02P 90/02
  USPC ........ 219/130.01, 124.5, 138, 137.2, 121.63, 219/121.83
  See application file for complete search history.

(56) References Cited

U.S. PATENT DOCUMENTS

| | | |
|---|---|---|
| D142,377 S | 9/1945 | Dunn |
| D152,049 S | 12/1948 | Alanson |
| 2,681,969 A | 6/1954 | Burke |
| D174,208 S | 3/1955 | Abildgaard |
| 2,728,838 A | 12/1955 | Barnes |
| D176,942 S | 2/1956 | Cross |
| 2,894,086 A | 7/1959 | Rizer |
| 3,035,155 A | 5/1962 | Hawk |
| 3,059,519 A | 10/1962 | Stanton |
| 3,356,823 A | 12/1967 | Waters et al. |
| 3,555,239 A | 1/1971 | Kerth |
| 3,581,051 A | 5/1971 | Brown et al. |
| 3,621,177 A | 11/1971 | McPherson et al. |
| 3,654,421 A | 4/1972 | Streetman et al. |
| 3,689,734 A | 9/1972 | Burley et al. |
| 3,739,140 A | 6/1973 | Rotilio |
| 3,847,584 A | 11/1974 | Houser |
| 3,866,011 A | 2/1975 | Cole |
| 3,867,769 A | 2/1975 | Schow et al. |
| 3,904,845 A | 9/1975 | Minkiewicz |
| 3,988,913 A | 11/1976 | Metcalfe et al. |
| D243,459 S | 2/1977 | Bliss |
| 4,024,371 A | 5/1977 | Drake |
| 4,041,615 A | 8/1977 | Whitehill |
| D247,421 S | 3/1978 | Driscoll |
| 4,104,724 A * | 8/1978 | Dix .................. G05B 19/10 700/212 |
| 4,124,944 A | 11/1978 | Blair |
| 4,132,014 A | 1/1979 | Schow |
| 4,145,593 A | 3/1979 | Merrick et al. |
| 4,153,913 A | 5/1979 | Swift |
| 4,237,365 A | 12/1980 | Lambros et al. |
| 4,280,041 A | 7/1981 | Kiessling et al. |
| 4,280,137 A | 7/1981 | Ashida et al. |
| 4,314,125 A | 2/1982 | Nakamura |
| 4,324,973 A | 4/1982 | Kirwan et al. |
| 4,359,622 A | 11/1982 | Dostoomian et al. |
| 4,375,026 A | 2/1983 | Kearney |
| 4,380,696 A | 4/1983 | Masaki |
| 4,390,954 A | 6/1983 | Manning |
| 4,410,787 A | 10/1983 | Kremers et al. |
| 4,419,560 A | 12/1983 | Zurek |
| 4,419,562 A | 12/1983 | Jon et al. |
| 4,429,266 A | 1/1984 | Tradt |
| 4,452,589 A | 6/1984 | Denison |
| D275,292 S | 8/1984 | Bouman |
| 4,477,713 A | 10/1984 | Cook et al. |
| 4,484,059 A | 11/1984 | Lillquist |
| 4,497,019 A | 1/1985 | Waber |
| D277,761 S | 2/1985 | Korovin et al. |
| 4,527,045 A | 7/1985 | Nakajima |
| D280,329 S | 8/1985 | Bouman |
| 4,611,111 A | 9/1986 | Baheti et al. |
| 4,616,326 A | 10/1986 | Meier et al. |
| 4,629,860 A | 12/1986 | Lindbom |
| 4,631,700 A | 12/1986 | Lapeyre |
| 4,677,277 A | 6/1987 | Cook et al. |
| 4,680,014 A | 7/1987 | Paton et al. |
| 4,681,999 A | 7/1987 | Hruska |
| 4,689,021 A | 8/1987 | Vasiliev et al. |
| 4,707,582 A | 11/1987 | Beyer |
| 4,716,273 A | 12/1987 | Paton et al. |
| D297,704 S | 9/1988 | Bulow |
| 4,785,159 A | 11/1988 | Hruska |
| 4,867,685 A | 9/1989 | Brush et al. |
| 4,877,940 A | 10/1989 | Bangs et al. |
| 4,881,678 A | 11/1989 | Gaudin |
| 4,897,521 A | 1/1990 | Burr |
| 4,907,973 A | 3/1990 | Hon |
| 4,920,248 A | 4/1990 | Toyoda et al. |
| 4,931,018 A | 6/1990 | Herbst et al. |
| 4,998,050 A | 3/1991 | Nishiyama et al. |
| 5,034,593 A | 7/1991 | Rice et al. |
| 5,061,841 A | 10/1991 | Richardson |
| 5,081,338 A | 1/1992 | Dufrenne |
| 5,089,914 A | 2/1992 | Prescott |
| 5,192,845 A | 3/1993 | Kirmsse et al. |
| 5,206,472 A | 4/1993 | Myking et al. |
| 5,206,474 A | 4/1993 | Fukuoka |
| 5,265,787 A | 11/1993 | Ishizaka et al. |
| 5,266,930 A | 11/1993 | Ichikawa et al. |
| 5,278,390 A | 1/1994 | Blankenship |
| 5,285,916 A | 2/1994 | Ross |
| 5,305,183 A | 4/1994 | Teynor |
| 5,306,893 A | 4/1994 | Morris et al. |
| 5,320,538 A | 6/1994 | Baum |
| 5,337,611 A | 8/1994 | Fleming et al. |
| 5,360,156 A | 11/1994 | Ishizaka et al. |
| 5,360,960 A | 11/1994 | Shirk |
| 5,380,978 A | 1/1995 | Pryor |
| D359,296 S | 6/1995 | Witherspoon |
| 5,424,634 A | 6/1995 | Goldfarb et al. |
| 5,436,638 A | 7/1995 | Bolas et al. |
| 5,449,877 A | 9/1995 | Buda et al. |
| 5,450,315 A | 9/1995 | Stefanski |
| 5,464,957 A | 11/1995 | Kidwell et al. |
| 5,467,957 A | 11/1995 | Gauger |
| D365,583 S | 12/1995 | Viken |
| 5,474,225 A | 12/1995 | Geier et al. |
| 5,493,093 A | 2/1996 | Cecil |
| 5,533,206 A | 7/1996 | Petrie et al. |
| 5,562,843 A | 10/1996 | Yasumoto |
| 5,651,903 A | 7/1997 | Shirk |
| 5,670,071 A | 9/1997 | Ueyama et al. |
| 5,676,503 A | 10/1997 | Lang |
| 5,676,867 A | 10/1997 | Van Allen |
| 5,708,253 A | 1/1998 | Bloch et al. |
| 5,710,405 A | 1/1998 | Solomon et al. |
| 5,719,369 A | 2/1998 | White et al. |
| D392,534 S | 3/1998 | Degen et al. |
| 5,728,991 A | 3/1998 | Takada et al. |
| 5,734,421 A | 3/1998 | Maguire, Jr. |
| 5,751,258 A | 5/1998 | Fergason et al. |
| D395,296 S | 6/1998 | Kaye et al. |
| 5,773,779 A | 6/1998 | Morlock |
| D396,238 S | 7/1998 | Schmitt |
| 5,781,258 A | 7/1998 | Dabral et al. |
| 5,823,785 A | 10/1998 | Matherne, Jr. |
| 5,835,077 A | 11/1998 | Dao et al. |
| 5,835,277 A | 11/1998 | Hegg |
| 5,837,968 A | 11/1998 | Rohrberg et al. |
| 5,845,053 A | 12/1998 | Watanabe et al. |
| 5,850,066 A | 12/1998 | Dew et al. |
| 5,859,847 A | 1/1999 | Dew et al. |
| 5,866,866 A | 2/1999 | Shimada |

(56) References Cited

U.S. PATENT DOCUMENTS

| | | |
|---|---|---|
| 5,877,468 A | 3/1999 | Morlock |
| 5,910,894 A | 6/1999 | Pryor |
| 5,949,388 A | 9/1999 | Atsumi et al. |
| 5,963,891 A | 10/1999 | Walker et al. |
| 6,002,104 A | 12/1999 | Hsu |
| 6,008,470 A | 12/1999 | Zhang et al. |
| 6,023,044 A | 2/2000 | Kosaka et al. |
| 6,049,059 A | 4/2000 | Kim |
| 6,051,805 A | 4/2000 | Vaidya et al. |
| 6,063,458 A | 5/2000 | Robertson et al. |
| 6,087,627 A | 7/2000 | Kramer |
| 6,114,645 A | 9/2000 | Burgess |
| 6,115,273 A | 9/2000 | Geisler |
| RE36,926 E | 10/2000 | Austin |
| 6,133,545 A | 10/2000 | Okazaki et al. |
| 6,151,640 A | 11/2000 | Buda et al. |
| 6,155,475 A | 12/2000 | Ekelöf et al. |
| 6,155,928 A | 12/2000 | Burdick |
| 6,167,328 A | 12/2000 | Takaoka et al. |
| 6,230,327 B1 | 5/2001 | Briand et al. |
| 6,236,013 B1 | 5/2001 | Delzenne |
| 6,236,017 B1 | 5/2001 | Smartt |
| 6,242,711 B1 | 6/2001 | Cooper |
| 6,267,291 B1 * | 7/2001 | Blankenship .... G06K 19/07749 219/136 |
| 6,271,500 B1 | 8/2001 | Hirayama et al. |
| 6,278,074 B1 | 9/2001 | Molock et al. |
| 6,292,715 B1 | 9/2001 | Hsu |
| 6,330,938 B1 | 12/2001 | Hervé et al. |
| 6,330,966 B1 | 12/2001 | Eissfeller |
| 6,331,848 B1 | 12/2001 | Stove et al. |
| D456,428 S | 4/2002 | Aronson, II et al. |
| 6,373,465 B2 | 4/2002 | Jolly et al. |
| D456,828 S | 5/2002 | Aronson, II et al. |
| 6,399,912 B1 | 6/2002 | Steenis et al. |
| D461,383 S | 8/2002 | Blackburn |
| 6,441,342 B1 | 8/2002 | Hsu |
| 6,444,942 B1 | 9/2002 | Kawai et al. |
| 6,445,964 B1 | 9/2002 | White et al. |
| 6,492,618 B1 | 12/2002 | Flood et al. |
| 6,506,997 B2 | 1/2003 | Matsuyama |
| 6,548,783 B1 | 4/2003 | Kilovsky et al. |
| 6,552,303 B1 | 4/2003 | Blankenship et al. |
| 6,560,029 B1 | 5/2003 | Dobbie et al. |
| 6,563,489 B1 | 5/2003 | Latypov et al. |
| 6,568,846 B1 | 5/2003 | Cote et al. |
| D475,726 S | 6/2003 | Suga et al. |
| 6,572,379 B1 | 6/2003 | Sears et al. |
| 6,583,386 B1 | 6/2003 | Ivkovich |
| 6,621,049 B2 | 9/2003 | Suzuki |
| 6,624,388 B1 | 9/2003 | Blankenship et al. |
| 6,636,776 B1 | 10/2003 | Barton et al. |
| D482,171 S | 11/2003 | Vui et al. |
| 6,644,645 B2 | 11/2003 | Bakodledis |
| 6,647,288 B2 | 11/2003 | Madill et al. |
| 6,649,858 B2 | 11/2003 | Wakeman |
| 6,655,645 B1 | 12/2003 | Lu et al. |
| 6,660,965 B2 | 12/2003 | Simpson |
| 6,697,701 B2 | 2/2004 | Hillen et al. |
| 6,697,770 B1 | 2/2004 | Nagetgaal |
| 6,700,097 B1 | 3/2004 | Hsu et al. |
| 6,703,585 B2 | 3/2004 | Suzuki |
| 6,708,385 B1 | 3/2004 | Lemelson |
| 6,710,298 B2 | 3/2004 | Eriksson |
| 6,710,299 B2 | 3/2004 | Blankenship et al. |
| 6,715,502 B1 | 4/2004 | Rome et al. |
| 6,717,108 B2 | 4/2004 | Hsu |
| D490,347 S | 5/2004 | Meyers |
| 6,730,875 B2 | 5/2004 | Hsu |
| 6,734,393 B1 | 5/2004 | Friedl et al. |
| 6,734,394 B2 | 5/2004 | Hsu |
| 6,744,011 B1 | 6/2004 | Hu et al. |
| 6,747,247 B2 | 6/2004 | Holverson et al. |
| 6,750,428 B2 | 6/2004 | Okamoto et al. |
| 6,768,974 B1 | 7/2004 | Nakano et al. |
| 6,772,802 B2 | 8/2004 | Few |
| 6,788,442 B1 | 9/2004 | Potin et al. |
| 6,795,778 B2 | 9/2004 | Dodge et al. |
| 6,798,974 B1 | 9/2004 | Nakano et al. |
| 6,822,195 B2 | 11/2004 | Kanodia et al. |
| 6,847,922 B1 | 1/2005 | Wampler, II |
| 6,847,956 B1 | 1/2005 | Manicke et al. |
| 6,857,553 B1 | 2/2005 | Hartman et al. |
| 6,858,817 B2 | 2/2005 | Blankenship et al. |
| 6,865,926 B2 | 3/2005 | O'Brien et al. |
| D504,449 S | 4/2005 | Butchko |
| 6,912,447 B2 | 6/2005 | Klimko et al. |
| 6,920,371 B2 | 7/2005 | Hillen et al. |
| 6,924,459 B2 | 8/2005 | Spear et al. |
| 6,930,280 B2 | 8/2005 | Zauner et al. |
| 6,940,039 B2 | 9/2005 | Blankenship et al. |
| 6,995,665 B2 | 2/2006 | Appelt et al. |
| 7,021,937 B2 | 4/2006 | Simpson et al. |
| 7,028,882 B2 | 4/2006 | Kilovsky et al. |
| 7,030,334 B1 | 4/2006 | Ruiz et al. |
| 7,032,814 B2 | 4/2006 | Blankenship |
| 7,072,774 B1 | 7/2006 | Houston |
| 7,102,098 B2 | 9/2006 | Rouault et al. |
| 7,126,078 B2 | 10/2006 | Demers et al. |
| 7,132,617 B2 | 11/2006 | Lee et al. |
| 7,170,032 B2 | 1/2007 | Flood |
| 7,194,447 B2 | 3/2007 | Harvey et al. |
| 7,247,814 B2 | 7/2007 | Ott |
| D555,446 S | 11/2007 | Picaza Ibarrondo |
| 7,315,241 B1 | 1/2008 | Daily et al. |
| D561,973 S | 2/2008 | Kinsley et al. |
| 7,353,715 B2 | 4/2008 | Myers |
| 7,358,458 B2 | 4/2008 | Daniel |
| 7,363,137 B2 | 4/2008 | Brant et al. |
| 7,375,304 B2 | 5/2008 | Kainec et al. |
| 7,381,923 B2 | 6/2008 | Gordon et al. |
| 7,414,595 B1 | 8/2008 | Muffler |
| 7,465,230 B2 | 12/2008 | LeMay et al. |
| 7,478,108 B2 | 1/2009 | Townsend et al. |
| D587,975 S | 3/2009 | Aronson, II et al. |
| 7,515,972 B2 | 4/2009 | Kumar et al. |
| 7,516,022 B2 | 4/2009 | Lee et al. |
| 7,523,069 B1 | 4/2009 | Friedl |
| 7,534,005 B1 | 5/2009 | Buckman |
| 7,539,603 B2 | 5/2009 | Subrahmanyam |
| 7,575,304 B2 | 8/2009 | Sugahara |
| D602,057 S | 10/2009 | Osicki |
| 7,603,191 B2 | 10/2009 | Gross |
| 7,617,017 B2 | 11/2009 | Menassa et al. |
| 7,621,171 B2 | 11/2009 | O'Brien |
| D606,102 S | 12/2009 | Bender et al. |
| 7,642,486 B2 | 1/2010 | Fosbinde et al. |
| 7,643,890 B1 | 1/2010 | Hillen et al. |
| 7,643,907 B2 | 1/2010 | Fuhlbrigge et al. |
| 7,687,741 B2 | 3/2010 | Kainec et al. |
| D614,217 S | 4/2010 | Peters et al. |
| D615,573 S | 5/2010 | Peters et al. |
| 7,772,524 B2 | 8/2010 | Hillen et al. |
| 7,809,534 B2 | 10/2010 | Sturrock et al. |
| 7,817,162 B2 | 10/2010 | Bolick et al. |
| 7,853,645 B2 | 12/2010 | Brown et al. |
| D631,074 S | 1/2011 | Peters et al. |
| 7,874,921 B2 | 1/2011 | Baszucki et al. |
| 7,962,967 B2 | 6/2011 | Becker et al. |
| 7,970,172 B1 | 6/2011 | Hendrickson |
| 7,972,129 B2 | 7/2011 | O'Donoghue |
| 7,991,587 B2 | 8/2011 | Ihn |
| 8,049,139 B2 | 11/2011 | Houston |
| 8,069,017 B2 | 11/2011 | Hallquist |
| 8,115,138 B2 | 2/2012 | Jacovetty et al. |
| 8,224,881 B1 | 7/2012 | Spear |
| 8,248,324 B2 | 8/2012 | Nangle |
| 8,265,886 B2 | 9/2012 | Bisiaux et al. |
| 8,274,013 B2 | 9/2012 | Wallace |
| 8,287,522 B2 | 10/2012 | Moses et al. |
| 8,312,060 B2 | 11/2012 | Gilbert et al. |
| 8,316,462 B2 | 11/2012 | Becker et al. |
| 8,322,591 B2 | 12/2012 | Diez et al. |
| 8,363,048 B2 | 1/2013 | Gering |

(56) References Cited

U.S. PATENT DOCUMENTS

| | | |
|---|---|---|
| 8,365,603 B2 | 2/2013 | Lesage et al. |
| 8,502,866 B2 | 8/2013 | Becker et al. |
| 8,512,043 B2 | 8/2013 | Choquet |
| 8,569,646 B2 | 10/2013 | Daniel et al. |
| 8,569,655 B2 | 10/2013 | Cole |
| 8,592,723 B2 | 11/2013 | Davidson et al. |
| 8,777,629 B2 | 7/2014 | Kreindl et al. |
| RE45,062 E | 8/2014 | Maguire, Jr. |
| 8,860,760 B2 | 10/2014 | Chen et al. |
| 8,884,177 B2 | 11/2014 | Daniel et al. |
| 9,089,921 B2 | 7/2015 | Daniel et al. |
| 9,104,195 B2 | 8/2015 | Daniel et al. |
| 9,323,056 B2 | 4/2016 | Williams |
| 9,937,577 B2 | 4/2018 | Daniel et al. |
| 2001/0045808 A1 | 11/2001 | Hietmann et al. |
| 2001/0052893 A1 | 12/2001 | Jolly et al. |
| 2002/0032553 A1 | 3/2002 | Simpson et al. |
| 2002/0046999 A1 | 4/2002 | Veikkolainen et al. |
| 2002/0050984 A1 | 5/2002 | Roberts |
| 2002/0085843 A1 | 7/2002 | Mann |
| 2002/0107825 A1 | 8/2002 | Manicke et al. |
| 2002/0117487 A1 | 8/2002 | Corby, Jr. et al. |
| 2002/0175897 A1 | 11/2002 | Pelosi |
| 2003/0000931 A1 | 1/2003 | Ueda et al. |
| 2003/0023592 A1 | 1/2003 | Modica et al. |
| 2003/0025884 A1 | 2/2003 | Hamana et al. |
| 2003/0106787 A1 | 6/2003 | Santilli |
| 2003/0111451 A1 | 6/2003 | Blankenship et al. |
| 2003/0165180 A1 | 9/2003 | Weerasinghe et al. |
| 2003/0172032 A1 | 9/2003 | Choquet |
| 2003/0234885 A1 | 12/2003 | Pilu |
| 2004/0008157 A1 | 1/2004 | Brubaker et al. |
| 2004/0020907 A1 | 2/2004 | Zauner et al. |
| 2004/0035990 A1 | 2/2004 | Ackeret |
| 2004/0050824 A1 | 3/2004 | Samler |
| 2004/0122550 A1 | 6/2004 | Klimko et al. |
| 2004/0140301 A1 | 7/2004 | Blankenship et al. |
| 2004/0232128 A1 | 11/2004 | Niedereder et al. |
| 2004/0245227 A1 | 12/2004 | Grafton-Reed et al. |
| 2005/0007504 A1 | 1/2005 | Fergason |
| 2005/0017152 A1 | 1/2005 | Fergason |
| 2005/0046584 A1 | 3/2005 | Breed |
| 2005/0050168 A1 | 3/2005 | Wen et al. |
| 2005/0101767 A1 | 5/2005 | Clapham et al. |
| 2005/0103766 A1 | 5/2005 | Iizuka et al. |
| 2005/0103767 A1 | 5/2005 | Kainec et al. |
| 2005/0109735 A1 | 5/2005 | Flood |
| 2005/0127052 A1 | 6/2005 | Spencer |
| 2005/0128186 A1 | 6/2005 | Shahoian et al. |
| 2005/0133488 A1 | 6/2005 | Blankenship et al. |
| 2005/0149210 A1 | 7/2005 | Britton |
| 2005/0159840 A1 | 7/2005 | Lin et al. |
| 2005/0189336 A1 | 9/2005 | Ku |
| 2005/0199602 A1 | 9/2005 | Kaddani et al. |
| 2005/0230573 A1 | 10/2005 | Ligertwood |
| 2005/0252897 A1 | 11/2005 | Hsu et al. |
| 2005/0275913 A1 | 12/2005 | Vesely et al. |
| 2005/0275914 A1 | 12/2005 | Vesely et al. |
| 2006/0010551 A1 | 1/2006 | Bishop et al. |
| 2006/0014130 A1 | 1/2006 | Weinstein |
| 2006/0070987 A1 | 4/2006 | Daniel |
| 2006/0131291 A1 | 6/2006 | Kaufman et al. |
| 2006/0136183 A1 | 6/2006 | Choquet |
| 2006/0163227 A1 | 7/2006 | Hillen et al. |
| 2006/0163230 A1 | 7/2006 | Kaufman |
| 2006/0169682 A1 | 8/2006 | Kainec et al. |
| 2006/0173619 A1 | 8/2006 | Brant et al. |
| 2006/0178778 A1 | 8/2006 | Fuhlbrigge et al. |
| 2006/0189260 A1 | 8/2006 | Sung |
| 2006/0207980 A1 | 9/2006 | Jacovetty et al. |
| 2006/0213892 A1 | 9/2006 | Ott |
| 2006/0214924 A1 | 9/2006 | Kawamoto et al. |
| 2006/0226137 A1 | 10/2006 | Huismann et al. |
| 2006/0252543 A1 | 11/2006 | Van Noland et al. |
| 2006/0258447 A1 | 11/2006 | Baszucki et al. |
| 2007/0034611 A1 | 2/2007 | Dirus et al. |
| 2007/0038400 A1 | 2/2007 | Lee et al. |
| 2007/0039937 A1 | 2/2007 | Jang et al. |
| 2007/0045488 A1 | 3/2007 | Shin |
| 2007/0056942 A1 | 3/2007 | Daniel et al. |
| 2007/0080153 A1 | 4/2007 | Albrecht |
| 2007/0088536 A1 | 4/2007 | Ishikawa |
| 2007/0112889 A1 | 5/2007 | Cook et al. |
| 2007/0198105 A1 | 8/2007 | Britton |
| 2007/0198117 A1 | 8/2007 | Wajihuddin |
| 2007/0211026 A1 | 9/2007 | Ohta |
| 2007/0221797 A1 | 9/2007 | Thompson et al. |
| 2007/0256503 A1 | 11/2007 | Wong et al. |
| 2007/0262065 A1 | 11/2007 | Peters et al. |
| 2007/0277611 A1 | 12/2007 | Portzgen et al. |
| 2007/0291035 A1 | 12/2007 | Vesely et al. |
| 2008/0031774 A1 | 2/2008 | Magnant et al. |
| 2008/0038702 A1 | 2/2008 | Choquet |
| 2008/0078811 A1 | 4/2008 | Hillen et al. |
| 2008/0078812 A1 | 4/2008 | Peters et al. |
| 2008/0117203 A1 | 5/2008 | Gering |
| 2008/0128398 A1 | 6/2008 | Schneider |
| 2008/0135533 A1 | 6/2008 | Ertmer et al. |
| 2008/0140815 A1 | 6/2008 | Brant et al. |
| 2008/0149686 A1 | 6/2008 | Daniel et al. |
| 2008/0158502 A1 | 7/2008 | Becker |
| 2008/0169277 A1 | 7/2008 | Achtner et al. |
| 2008/0203075 A1 | 8/2008 | Feldhausen et al. |
| 2008/0233550 A1 | 9/2008 | Solomon |
| 2008/0314887 A1 | 12/2008 | Stoger et al. |
| 2009/0015585 A1 | 1/2009 | Klusza |
| 2009/0021514 A1 | 1/2009 | Klusza |
| 2009/0045183 A1 | 2/2009 | Artelsmair et al. |
| 2009/0057286 A1 | 3/2009 | Ihara et al. |
| 2009/0094721 A1 | 4/2009 | Becker |
| 2009/0107969 A1 | 4/2009 | Asai et al. |
| 2009/0152251 A1 | 6/2009 | Dantinne et al. |
| 2009/0173726 A1 | 7/2009 | Davidson et al. |
| 2009/0184098 A1 | 7/2009 | Daniel et al. |
| 2009/0200281 A1 | 8/2009 | Hampton |
| 2009/0200282 A1 | 8/2009 | Hampton |
| 2009/0231423 A1 | 9/2009 | Becker et al. |
| 2009/0259444 A1 | 10/2009 | Dolansky et al. |
| 2009/0277893 A1 | 11/2009 | Spellman |
| 2009/0298024 A1 | 12/2009 | Batzler et al. |
| 2009/0313549 A1 | 12/2009 | Casner et al. |
| 2009/0325699 A1 | 12/2009 | Delgiannidis |
| 2010/0012017 A1 | 1/2010 | Miller |
| 2010/0012625 A1 | 1/2010 | Silk et al. |
| 2010/0012637 A1 | 1/2010 | Jaeger |
| 2010/0048273 A1 | 2/2010 | Wallace et al. |
| 2010/0062405 A1 | 3/2010 | Zboray et al. |
| 2010/0062406 A1 | 3/2010 | Zboray et al. |
| 2010/0096373 A1 | 4/2010 | Hillen et al. |
| 2010/0121472 A1 | 5/2010 | Babu et al. |
| 2010/0133247 A1 | 6/2010 | Mazumder et al. |
| 2010/0133250 A1 | 6/2010 | Sardy et al. |
| 2010/0169053 A1 | 7/2010 | Martis et al. |
| 2010/0176107 A1 | 7/2010 | Bong |
| 2010/0201803 A1 | 8/2010 | Melikian |
| 2010/0217440 A1 | 8/2010 | Lindell |
| 2010/0224610 A1 | 9/2010 | Wallace |
| 2010/0262468 A1 | 10/2010 | Blankenship et al. |
| 2010/0276396 A1 | 11/2010 | Cooper et al. |
| 2010/0299101 A1 | 11/2010 | Shimada et al. |
| 2010/0307249 A1 | 12/2010 | Lesage et al. |
| 2011/0006047 A1 | 1/2011 | Penrod et al. |
| 2011/0009985 A1 | 1/2011 | Nixon et al. |
| 2011/0060568 A1 | 3/2011 | Goldfine et al. |
| 2011/0083241 A1 | 4/2011 | Cole |
| 2011/0091846 A1 | 4/2011 | Kreindl et al. |
| 2011/0114615 A1 | 5/2011 | Daniel et al. |
| 2011/0116076 A1 | 5/2011 | Chantry et al. |
| 2011/0117527 A1 | 5/2011 | Conrardy et al. |
| 2011/0120978 A1 | 5/2011 | Takahashi et al. |
| 2011/0122495 A1 | 5/2011 | Togashi |
| 2011/0172796 A1 | 7/2011 | Sohmshetty et al. |
| 2011/0183304 A1 | 7/2011 | Wallace et al. |
| 2011/0198329 A1 | 8/2011 | Davidson et al. |

(56) References Cited

U.S. PATENT DOCUMENTS

| | | |
|---|---|---|
| 2011/0246395 A1 | 10/2011 | Dolson et al. |
| 2011/0248864 A1 | 10/2011 | Becker et al. |
| 2011/0255259 A1 | 10/2011 | Weber et al. |
| 2011/0290765 A1 | 12/2011 | Albrecht et al. |
| 2011/0316516 A1 | 12/2011 | Schiefermüller et al. |
| 2012/0081564 A1 | 4/2012 | Kamiya |
| 2012/0095941 A1 | 4/2012 | Dolson et al. |
| 2012/0122062 A1 | 5/2012 | Yang et al. |
| 2012/0145689 A1 | 6/2012 | Hillen et al. |
| 2012/0189993 A1 | 7/2012 | Kindig et al. |
| 2012/0291172 A1 | 11/2012 | Wills et al. |
| 2012/0298640 A1 | 11/2012 | Conrardy et al. |
| 2012/0325792 A1 | 12/2012 | Stein et al. |
| 2013/0008003 A1 | 1/2013 | Izutani et al. |
| 2013/0015169 A1 | 1/2013 | Marschke et al. |
| 2013/0026150 A1 | 1/2013 | Chantry et al. |
| 2013/0040270 A1 | 2/2013 | Albrecht |
| 2013/0075380 A1 | 3/2013 | Albrech et al. |
| 2013/0119037 A1 | 5/2013 | Daniel |
| 2013/0189657 A1 | 7/2013 | Wallace et al. |
| 2013/0189658 A1 | 7/2013 | Peters et al. |
| 2013/0206741 A1 | 8/2013 | Pfeifer et al. |
| 2013/0230832 A1 | 9/2013 | Peters et al. |
| 2013/0242110 A1 | 9/2013 | Terre et al. |
| 2013/0264319 A1 | 10/2013 | Temby et al. |
| 2013/0277344 A1 | 10/2013 | Guymon et al. |
| 2013/0282182 A1 | 10/2013 | Hideg |
| 2013/0291271 A1 | 11/2013 | Becker et al. |
| 2014/0021184 A1 | 1/2014 | Daniel |
| 2014/0027422 A1 | 1/2014 | Panelli |
| 2014/0038143 A1 | 2/2014 | Daniel et al. |
| 2014/0042135 A1 | 2/2014 | Daniel et al. |
| 2014/0042136 A1 | 2/2014 | Daniel et al. |
| 2014/0042137 A1 | 2/2014 | Daniel et al. |
| 2014/0134579 A1 | 5/2014 | Becker |
| 2014/0134580 A1 | 5/2014 | Becker |
| 2014/0263224 A1 | 9/2014 | Becker |
| 2014/0263225 A1 | 9/2014 | Daniel et al. |
| 2014/0263226 A1 | 9/2014 | Daniel et al. |
| 2014/0272836 A1 | 9/2014 | Becker |
| 2014/0272837 A1 | 9/2014 | Becker |
| 2014/0272838 A1 | 9/2014 | Becker |
| 2014/0346158 A1 | 11/2014 | Matthews |
| 2015/0056584 A1 | 2/2015 | Boulware et al. |
| 2015/0056585 A1 | 2/2015 | Boulware et al. |
| 2015/0056586 A1 | 2/2015 | Penrod et al. |
| 2015/0234189 A1 | 8/2015 | Lyons |
| 2015/0268473 A1 | 9/2015 | Yjima et al. |
| 2016/0165220 A1 | 6/2016 | Fujimaki et al. |
| 2016/0188277 A1 | 6/2016 | Miyasaka et al. |
| 2016/0260261 A1 | 9/2016 | Hsu |
| 2016/0331592 A1 | 11/2016 | Stewart |
| 2016/0361774 A9 | 12/2016 | Daniel et al. |
| 2017/0045337 A1 | 2/2017 | Kim |

FOREIGN PATENT DOCUMENTS

| | | |
|---|---|---|
| CN | 1370654 A | 9/2002 |
| CN | 1469791 A | 1/2004 |
| CN | 101209512 A | 7/2008 |
| CN | 101214178 A | 7/2008 |
| CN | 201083660 Y | 7/2008 |
| CN | 201229711 Y | 4/2009 |
| CN | 101571887 A | 11/2009 |
| CN | 101600532 A | 12/2009 |
| CN | 101419755 B | 8/2010 |
| CN | 101587659 B | 2/2011 |
| CN | 20219978 U | 4/2012 |
| CN | 102573720 A | 7/2012 |
| CN | 102596476 A | 7/2012 |
| CN | 103871279 A | 6/2014 |
| CN | 105209994 A | 12/2015 |
| CN | 105229545 A | 1/2016 |
| CN | 106270941 A | 1/2017 |
| DE | 2833638 A1 | 2/1980 |
| DE | 3046634 C2 | 1/1983 |
| DE | 3244307 A1 | 5/1984 |
| DE | 3522581 A1 | 1/1987 |
| DE | 4037879 A1 | 6/1991 |
| DE | 19615069 A1 | 10/1997 |
| DE | 19739720 C1 | 10/1998 |
| DE | 19834205 A1 | 2/2000 |
| DE | 20009543 U1 | 8/2001 |
| DE | 102005047204 A1 | 4/2007 |
| DE | 102010023663 A1 | 12/2011 |
| DE | 102010038902 B4 | 2/2012 |
| DE | 202012013151 U1 | 2/2015 |
| EP | 0127299 A1 | 12/1984 |
| EP | 0145891 A1 | 6/1985 |
| EP | 108599 B1 | 12/1988 |
| EP | 19623 A1 | 6/1989 |
| EP | 0852986 A1 | 7/1998 |
| EP | 1078707 A1 | 2/2001 |
| EP | 1170649 A1 | 1/2002 |
| EP | 1700667 A1 | 9/2006 |
| EP | 1702707 A1 | 9/2006 |
| EP | 1724676 A1 | 11/2006 |
| EP | 1750185 B1 | 2/2007 |
| EP | 1527852 B1 | 3/2008 |
| EP | 1905533 A2 | 4/2008 |
| EP | 1905533 B1 | 11/2013 |
| ES | 2274736 B1 | 3/2008 |
| FR | 1456780 A | 7/1966 |
| FR | 2827066 B1 | 4/2005 |
| FR | 2926660 B1 | 6/2011 |
| GB | 1455972 A | 11/1976 |
| GB | 1511608 A | 5/1978 |
| GB | 2254172 B | 12/1992 |
| GB | 2435838 A | 9/2007 |
| GB | 2454232 B | 4/2012 |
| JP | 02224877 A | 9/1990 |
| JP | 03005083 A | 1/1991 |
| JP | 05329645 A | 12/1993 |
| JP | 07047471 A | 2/1995 |
| JP | 07232270 A | 9/1995 |
| JP | 08132274 A | 5/1996 |
| JP | 08150476 A | 6/1996 |
| JP | 08505091 A | 6/1996 |
| JP | 2000167666 A | 6/2000 |
| JP | 2001071140 A | 3/2001 |
| JP | 2001290518 A | 10/2001 |
| JP | 2002278670 A | 9/2002 |
| JP | 2003200372 A | 7/2003 |
| JP | 2003326362 A | 11/2003 |
| JP | 2006006604 A | 1/2006 |
| JP | 2006281270 A | 10/2006 |
| JP | 2007290025 A | 11/2007 |
| JP | 2009500178 A | 1/2009 |
| JP | 2009160636 A | 7/2009 |
| JP | 2010075954 A | 4/2010 |
| JP | 2011070539 A | 4/2011 |
| JP | 2012024867 A | 2/2012 |
| KR | 20090010693 A | 1/2009 |
| NO | 2011058433 A1 | 5/2011 |
| RU | 2008108601 A | 9/2009 |
| SU | 1038963 A1 | 8/1983 |
| WO | 9845078 A1 | 10/1998 |
| WO | 01012376 A1 | 2/2001 |
| WO | 0143910 A1 | 6/2001 |
| WO | 01058400 A1 | 8/2001 |
| WO | 2002086656 A2 | 10/2002 |
| WO | 2005084867 A2 | 9/2005 |
| WO | 2005102230 A1 | 11/2005 |
| WO | 2006034571 A1 | 4/2006 |
| WO | 2007009131 A1 | 1/2007 |
| WO | 2007039278 A1 | 4/2007 |
| WO | 2008031052 A2 | 3/2008 |
| WO | 2008079165 A1 | 7/2008 |
| WO | 2009060231 A1 | 5/2009 |
| WO | 2009120921 A1 | 10/2009 |
| WO | 2009149740 A1 | 12/2009 |
| WO | 2010000003 A2 | 1/2010 |
| WO | 2010044982 A1 | 4/2010 |
| WO | 2010091493 A1 | 8/2010 |

(56) References Cited

FOREIGN PATENT DOCUMENTS

| WO | 2010142858 | A1 | 12/2010 |
|---|---|---|---|
| WO | 2011045657 | A1 | 4/2011 |
| WO | 2011067447 | A1 | 6/2011 |
| WO | 2011100214 | A1 | 8/2011 |
| WO | 2012004491 | A2 | 1/2012 |
| WO | 2011097035 | A3 | 2/2012 |
| WO | 2012082105 | A1 | 6/2012 |
| WO | 2012143327 | A1 | 10/2012 |
| WO | 2013014202 | A1 | 1/2013 |
| WO | 2013114189 | A1 | 8/2013 |
| WO | 2013160745 | A1 | 10/2013 |
| WO | 2013175079 | A1 | 11/2013 |
| WO | 2014007830 | A1 | 1/2014 |
| WO | 2014019045 | A1 | 2/2014 |
| WO | 2014020386 | A1 | 2/2014 |
| WO | 2014140738 | A2 | 9/2014 |
| WO | 2014140743 | A1 | 9/2014 |
| WO | 2014140746 | A2 | 9/2014 |
| WO | 2014140747 | A2 | 9/2014 |
| WO | 2014140749 | A1 | 9/2014 |
| WO | 2014140766 | A1 | 9/2014 |

OTHER PUBLICATIONS

International Preliminary Report on Patenability from PCT/US07/15014 dated Jun. 23, 2009.
International Search Report and Written Opinion from PCT/IB2014/000313 dated Sep. 10, 2014.
International Search Report and Written Opinion from PCT/IB2014/000319 dated Aug. 29, 2014.
International Search Report and Written Opinion from PCT/IB2014/000323 dated Sep. 19, 2014.
International Search Report and Written Opinion from PCT/IB2014/000324 dated Sep. 8, 2014.
International Search Report and Written Opinion from PCT/IB2014/000326 dated Aug. 29, 2014.
International Search Report and Written Opinion from PCT/IB2014/000350 dated Sep. 4, 2014.
International Preliminary Report on Patentability from PCT/IB2014/000350 dated Sep. 15, 2015.
International Preliminary Report on Patentability from PCT/IB2015/001991 dated May 26, 2017.
Lincoln Electric Company Product Brochure for NA-3 and NA-4, Automatic Welding Systems with Solid State Controls, brochure, E9.10, May 1994.
Power Feed 10M, Publication E8.266, Aug. 2004 brochure.
Lincoln Electric Company Product Brochure for Power Wave 455 M & Power Wave 455 M/Sti, Publication E5.161, Aug. 2004, brochure.
Lincoln Electric Company Product Brochure for NA-5 Automatic Wedling System, brochure, Publication No. 9.30, Nov. 1999.
The Lincoln Company, Product Brochure for Waveform Control Technology, Publication No. NX-1.10, Nov. 2003.
"Interim Guidance for Determining Subject Matter Eligibility for Process Claims in View of *Bilski* v. *Kappos*," 75 Fed. Reg. 43,922-43,928 (Jul. 27, 2010), 7 pages.
Echtler et al., "The Intelligent Welding Gun: Augmented Reality for Experimental Vehicle Construction;" In: Virtual and Augmented Reality Applications in Manufacturing; Ong. S.K. and Nee A.Y.C. eds. Springer Verlag 2003. 28 pgs., Jan. 1, 2003.
Rubinovitz et al., Task Leevl Off-Line Programming System for Robotic Arc Welding—An Overview 8287 Journal of Manufacturing Systems, 7 (1988) No. 4, Dearborn, MI USA; pp. 293-305.
Receive—definition from Dictionary.com downloaded Oct. 21, 2018.
Hoff et al.; "Computer vision-based registration techniques for augmented reality"; Proceedings of Intelligent Robots and Computer Vision XV; SPIE vol. 2904; Dated Nov. 18-22, 1996; pp. 538-548.

Mann, et al.; "Realtime HOR (High Dynamic Range) Video for Eyetap Wearable Computers, FPGA-Based Seeing Aids, and Glasseyes (Eyetaps);" Univ. of Toledo, IIEEE Canadian Conf. on Electrical and Computer Eng., 2012; pp. 1-6.
Hillers, et al.; "Augmented Reality—The third way for new technologies in welding education;" GSI SLV Duisburg, Tech. Conf. "Welding Trainer 2010" 08-09; Dated Sep. 2010; pp. 1-4.
Farber; "The next big thing in tech: Augmented reality;" Sci-Tech CNET; Dated Jun. 7, 2013; pp. 1-11.
Stone, et al.; "Full Virtual Reality vs. Integrated Virtual Reality Training in Welding, " Supplement to the Welding Journal; Dated Jun. 2013; vol. 92; pp. 167-s-174-s.
Aiteanu, et al.; "A step forward in manual welding: demonstration of augmented reality helmet;" IEEE Xplore Abstract; Accessed Jan. 15, 2016; pp. 1-2.
Tschirner, et al.; "A Concept for the Application of Augmented Reality in Manual Gas Metal Arc Welding;" Proceeding of the international Symposium on Mixed and Augmented Reality (SIMAR'02), IEEE Computer Society,; Dated 2002; pp. 1-2.
Morpha Style Guide compiled by: KUKA Roboter GmbH and Reis GmbH & Co Maschinenfabrik; BMBF Lead Project Anthropomorphe Assisenzsysteme (Morpha); Style Guide for Icon-based Programming; Accessed Mar. 2015; pp. 1-56.
XP-002422858; "Getting Started with LabView Virtual Instruments;" National Instruments Corporation; Accessed Mar. 2015; pp. 1-70.
VJ Technologies; "Vi3 Imaging Software;" Dated May 2011; pp. 1-2.
Edison Welding Institute; "E-Weld Predictor;" Dated 2008; pp. 1-3.
Eduwelding+; "Weld Into the Future;" Online Welding Seminar—A virtual training environment; www.123arc.com; Dated 2005; pp. 1-4.
Eduwelding+; "Training Activities with ARC+ Simulator; Weld Into The Future;" Online Welding Simulator—A virtual training environment; www.123arc.com; Dated May 2008; pp. 1-6.
Joanneum; "Fronius—virtual welding;" Dated May 12, 2008; pp. 1-2.
Heston; "Virtually welding;" thefabricator.com; Dated Mar. 11, 2008; pp. 1-4.
Fast, et al.; "Virtual Training for Welding;" Mixed and Augmented Reality, 2004, ISMAR 2004, Third IEEE and CM International Symposium; Dated Nov. 2-5, 2004; pp. 1-2.
Garcia-Ellende, et al.; "Defect Detection in Arc-Welding Processes by Means of the Line-to-Continuum Method and Feature Selection;" www.mdpi.com/journal/sensors; Sensors 2009, 9, 7753-7770; doi; 10.3390/s91007753; Published Sep. 29, 2009; pp. 7754-7770.
Hillis, et al.; "Data Parallel Algorithms;" Communications of the ACM; vol. 29, No. 12; Dated Dec. 1986; pp. 1170-1183.
Mahrle, et al.; "The influence of fluid flow phenomena on the laser beam welding process;" International Journal of Heat and Fluid Flow 23; Dated 2002; pp. 288-297.
The Lincoln Electric Company; "CheckPoint Production Monitoring brochure;" http://www.lincolnelectric.com/assets/en_US/products/literature/s232.pdf; Publication S2.32; Dated Feb. 2012; pp. 1-4.
The Lincoln Electric Company; "Production Monitoring 2;" Dated May 2009; pp. 1-4.
Lindholm, et al.; "NVIDIA Testla: A Unifired Graphics and Computing Architecture;" IEEE Computer Society; Dated 2008; pp. 39-55.
Mavrikios, et al.; "A prototype virtual reality-based demonstrator for immersive and interactive simulation of welding processes;" International Journal of Computer Integrated Manufacturing; vol. 19, No. 3; Dated Apr. 1, 2006; pp. 294-300.
Chironis, et al.; "Mechanisms and Mechanical Devices SourceBook;" McGraw Hill; 2nd Addition; Dated 1996; pp. 1-10.
Miller Electric Mfg.Co.; "MIG Welding System features weld monitoring software;" NewsRoom 2010 (Dialog File 992); copyright 2011 Dialog 2010; http://www.dialogweb.com/cgi/dwclient?reg=1331233430487; Dated Mar. 8, 2012; pp. 1-3.
NSRP ASE; "Low-Cost Virtual Reality Welder Training System;" Dated 2008; p. 1.
N. A. Tech.; "P/NA.3 Process Modeling and Optimization;" Dated Jun. 4, 2008; pp. 1-11.

(56) References Cited

OTHER PUBLICATIONS

Porter, et al.; "Virtual Reality Welder Training;" Paper No. 2005-P19; Dated 2005; pp. 1-16.
Schoder; "Design and Implementation of a Video Sensor for Closed Loop Control of Back Bead Weld Puddle Width;" Massachusetts Institute of Technology, Dept. of Mechanical Engineering; Dated May 27, 1983; pp. 1-64.
Lim, et al.; "Automatic classification of weld defects using simulated data and an MLP neutral network;" Insight, vol. 49, No. 3; Dated Mar. 2007; pp. 154-159.
Russell, et al.; "Artificial Intelligence: A Modern Approach;" Prentice-Hall; Copyright 1995; pp. 1-20.
chemweb.com; "Journal of Materials Engineering and Performance (v.7, #5);" Printed Sep. 26, 2012; pp. 1-3.
VRSim; "SimWelder;" http://www.simwelder.com; Retrieved on Apr. 12, 2010; pp. 1-2.
Simfor/Cesol; "RV-Sold Welding Simulator;" Accessed on Apr. 26, 2013; pp. 1-20.
Wade; "Human uses of ultrasound: ancient and modern;" Ultrasonics, vol. 38; Dated 2000; pp. 1-5.
Wang, et al.; "Numerical Analysis of Metal Transfer in Gas Metal Arc Welding under Modified Pulsed Current Conditions;" Metallurgical and Material Transactions B; vol. 35B; Dated Oct. 2004; pp. 857-865.
Wang et al.; "Study on Welder Training by Means of Haptic Guidance and Virtual Reality for Arc Welding;" Proceedings of the 2006 IEEE International Conference on Robotics and Biomimetics; Dated Dec. 17, 2006; pp. 954-958.
White, et al.; "Virtual Welder Trainer;" IEEE Virtual Reality Conference; Dated 2009; pp. 303, 2009.
O'Brien; "Google's Project Glass gets some more details;" http://www.engadget.com/2012/06/27/googles-project-glass-gets-some-more-details/, Dated Jun. 27, 2012; pp. 1-4.
Desroches; "Code-Aster: Note of use for calculations of welding;" Instruction Manual U2.03 Booklet: Thermomechanical; Document: U2.03.05; Dated Oct. 1, 2003; pp. 1-13.
ASME; "ASME Definitions, Consumables, Welding Positions;" http://www.gowelding.com/wp/asme4.htm; Dated Mar. 19, 2001; pp. 1-3.
Abbas, et al.; "Code_Aster: Introduction to Code_Aster;" User Manual; Booket U1 .0-: Introduction to Code_Aster; Document: U1 .02.00; Version 7.4; Dated Jul. 22, 2005; pp. 1-14.
Agren; "Sensor Integration for Robotic Arc Welding;" Lunds Universitet, vol. 5604C of Dissertations Abstracts International; Dated 1995; Printed Mar. 8, 2012; p. 1123.
Abid, et al.; "Numerical simulation to study the effect of tack welds and root gap on welding deformations and residual stresses of a pipe-flange joint;" International Journal of Pressure Vessels and Piping 82 (2005); Dated Aug. 25, 2005; pp. 860-871.
Aidun, et al.; "Penetration in Spot GTA Welds during Centrifugation;" Journal of Materials Engineering and Performance; vol. 7(5); Dated Oct. 1998; pp. 597-600.
Ars Electronica; "Fronius: High-speed video technology is applied to research on welding equipment, and the results are visualized in the CAVE;" Dated May 18, 1997; pp. 1-2.
asciencetutor.com; "VWL (Virtual Welding Lab);" Dated 2007; pp. 1-2.
Borzecki, et al.; "Specialist Committee V.3: Fabrication Technology;" 16th International Ship and Offshore Structures Congress; vol. 2; Dated Aug. 20, 2006; pp. 115-163.
CS Wave; "The Virtual Welding Trainer;" Dated 2007; pp. 1-6.
Da Dalto, et al.; "CS Wave: A Virtual learning tool for welding motion;" Dated Mar. 14, 2008; pp. 1-10.
Choquet; "ARC+: Today's Virtual Reality Solution for Welders;" 123 Certification Inc.; Dated Jan. 1, 2008; pp. 1-6.
EWI; "Virtual Reality Welder Training;" Cooperative Research Program; Summary Report SR 0512; Dated Jul. 19, 2005; pp. 1-4.
International Search Report and Written Opinion from PCT/IB10/02913 dated Apr. 19, 2011.

Guu, et al.; "Technique for Simultaneous Real-Time Measurements of Weld Pool Surface Geometry and Arc Force;" Welding Research Supplement; Dated Dec. 1992; pp. 473-s-482-s.
Chen, et al.; "Self-Learning Fuzzy Neural Networks and Computer Vision for Control of Pulsed GTAW;" Welding Research Supplement; Dated May 1997; pp. 201-s-209-s.
Rodjito; "Position tracking and motion prediction using Fuzzy Logic;" Colby College; Honors Thesis: Department of Computer Science; Paper 520; Dated 2006; pp. 1-81.
D'Huart, et al.; "Virtual Environment for Training;" 6th International Conference, ITS 20002; Dated Jun. 2002; pp. 1-6.
Nasios; "Improving Chemical Plant Safety Training Using Virtual Reality;" University of Nottingham, School of Chemical, Environmental, and Mining Engineering; Dated Dec. 2001; pp. 1-313.
Porter, et al.; "Virtual Reality Welder Training;" Session 5: Joining Technologies for Naval Applications; Dated Jul. 14, 2006; pp. 1-29.
Mantinband, et al.; "Autosteroscopic, field-sequential display with full freedom of movement OR Let the display were the shutter-glasses!;" Proceedings of SPIE, vol. 4660; Dated 2002; pp. 246-253.
Vizitech USA; "Changing the Way America Learns;" http://vizitechusa.com/; Retrieved on Mar. 27, 2014; pp. 1-2.
Cayo, et al.; "A Non-Intrusive GMA Welding Process Quality Monitoring System Using Acoustic Sensing;" Sensors, vol. 9; Dated Sep. 9, 2009; pp. 7150-7166.
Wu; "Microcomputer-based welder training simulator;" Computers in Industry 20; Dated 1992; pp. 321-325.
Teeravarunyou, et al.; "Computer Based Welding Training System;" International Journal of Industrial Engineering, 16(2); Dated Jan. 19, 2009; pp. 116-125.
Antonelli, et al.; "A Semi-Automated Welding Station Exploiting Human-Robot Interaction;" Advanced Manufacturing Systems and Technology; Dated Jun. 2011; pp. 249-260.
Praxaire Technology, Inc.; "The RealWeld Trainer System: Real Weld Training Under Real Conditions;" Product Brochure; Dated 2013; pp. 1-2.
United States Provisional Patent Application for "System for Characterizing Manual Welding Operations on Pipe and Other Curved Structures;" U.S. Appl. No. 62/055,724, filed Sep. 26, 2014; p. 1-35.
Lincoln Global, Inc.; "VRTEX 360: Virtual Reality Arc Welding Trainer;" Product Brochure; Dated 2015; pp. 1-4.
Wuhan Onew Technology Co. Ltd.; "ONEW-360 Welding Training Simulator;" http://en.onew1ech.com/_d276479751.htm; Accessed Jul. 10, 2015; pp. 1-12.
The Lincoln Electric Company, "VRTEX Virtual Reality Arc Welding Trainer," http://www.lincolnelectric.com/en-us/equipment/training-equipment/Pages/vrtex.aspx; Accessed Jul. 10, 2015; pp. 1-3.
Miller Electric Mfg. Co.; "LiveArc: Welding Performance Management System;" Owner's Manual; Dated Jul. 2014; pp. 1-64.
Miller Electric Mfg. Co.; "LiveArc Welding Performance Management System;" Product Brochure; Dated Dec. 2014; pp. 1-4.
Hu, et al.; "Heat and mass transfer in gas metal arc welding. Part 1: The arc;" http://www.web.mst.eduHsai/publications/HU-IJHMT-2007-1-60.pdf; International Journal of Heat and Mass Transfer; vol. 50 (2007); Dated Oct. 24, 2006; pp. 833-846.
Graham; "Texture Mapping;" Carnegie Mellon University; Class 15-462 Computer Graphics; Lecture 10; Dated Feb. 13, 2003; pp. 1-53.
Reeves; "Particles Systems—A Technique for Modeling a Class of Fuzzy Objects;" Computer Graphics; vol. 17, No. 3; Dated Jul. 1983; pp. 359-376.
Jonsson, et al.; "Simulation of Tack Welding Procedures in Butt Joint Welding of Plates;" Welding Research Supplement; Dated Oct. 1985; pp. 296-s-302-s.
Veiga; "Simulation of a Work Cell in the IGRIP Program;" Master's Thesis; Master of Science Programme, Mechanical Engineering; Lulea University of Technology; Dated Apr. 2006; pp. 1-50.
Balijepalli, et al.; "A Haptic Based Virtual Grinding Tool;" Proceedings of the 11th Symposium on Haptic Interfaces for Virtual Environment and Teleoperator Systems; Dated Jul. 2003; pp. 1-7.
Hirche, et al.; "Hardware Accelerated Per-Pixel Displacement Mapping;" Proceedings of Graphics Interface; Dated May 17, 2004; pp. 1-8.

(56) References Cited

OTHER PUBLICATIONS

Yao, et al.; "Development of a Robot System for Pipe Welding;" 2010 International Conference on Measuring Technology and Mechatronics Automation; http://ieeexplore.ieee.org/stamp/stamp.jsp?tp=&arnumber=5460347&tag=1; Dated 2010; pp. 1109-1112.
Dotson; "Augmented Reality Welding Helmet Prototypes How Awesome the Technology Can Get;" http://siliconangle.com/blog/2012/09/26/augmented-reality-welding-helmet-prototypes-how-awesome-the-technology-can-get/, Dated Sep. 26, 2012; pp. 1-3.

* cited by examiner

METHOD FOR A WELDING SEQUENCER

CROSS-REFERENCE TO RELATED APPLICATIONS

This application is a division of U.S. application Ser. No. 15/948,357, filed Apr. 9, 2018, and entitled "SYSTEM FOR A WELDING SEQUENCER", which is a continuation of U.S. application Ser. No. 13/802,951, filed Mar. 14, 2013, now U.S. Pat. No. 9,937,577, issued Apr. 10, 2018, and entitled "SYSTEM FOR A WELDING SEQUENCER", which is a continuation-in-part of U.S. application Ser. No. 11/613,652, filed Dec. 20, 2006, now U.S. Pat. No. 9,104,195, issued Aug. 11, 2015, and entitled "WELDING JOB SEQUENCER." The entirety of the aforementioned applications are incorporated herein by reference.

TECHNICAL FIELD

Devices, systems, and methods consistent with the invention relate to welding work cells.

BACKGROUND OF THE INVENTION

In the related art, work cells are used to produce welds or welded parts. There are at least two broad categories of work cells, including robotic work cells and semi-automatic work cells.

In robotic work cells, the scheduling and performing of welding operations is largely automated, with little operator involvement. Thus, these cells generally have a relatively low labor cost and a relatively high productivity. However, their repeating operations cannot easily adapt to varying welding conditions and/or sequences.

In contrast, semi-automatic work cells (i.e., work cells involving at least some operator welding) generally provide less automation vis-à-vis robotic work cells, and accordingly have a relatively higher labor cost and a relatively lower productivity. Nevertheless, there are many instances where using a semi-automatic welding work cell can actually be advantageous over robotic work cells. For example, a semi-automatic welding work cell can more easily adapt to varying welding conditions and/or sequences.

Unfortunately, when welding more complex assemblies in related art semi-automatic work cells, multiple different welding schedules are often required for different types of welds on different parts of an assembly. In many systems, when a different welding schedule must be utilized, the operator is required to stop welding operations and manually adjust the output of the semi-automatic equipment according to the new schedule. In some other systems, this manual adjustment is eliminated by storing particular schedules in the work cell. Nevertheless, even in such systems, the operator still needs to cease welding operations and push a button to select the new welding schedule before he may continue welding.

Neither of these practices for setting a different welding schedule is particularly efficient. Thus, in practice, the number of welding schedules used in a semi-automatic work cell is often reduced in order to eliminate the need for constant adjustment of the output of the semi-automatic equipment. While this reduction of welding schedules makes the overall operation easier for the welder, the forced simplification of this approach can lead to reduced productivity and lower overall quality.

Additionally, when abiding by strict quality control specifications, it is sometimes necessary to perform welds in a specific sequence, verify that each weld is performed with a given set of conditions, and monitor the output of the equipment during the welding operations. In a robotic work cell, these requirements are easily fulfilled. However, in a semi-automatic work cell, these requirements are susceptible to human error, since the operator must keep track of all of these aspects in addition to performing the welding operations themselves.

An illustrative example of the above problems is shown in the related art semi-automatic welding method diagrammatically represented in FIG. 1. In this method, each of the various scheduling, sequencing, inspection and welding operations are organized and performed by the operator (i.e., the welder) himself. Specifically, the operator begins the welding job at operation 10. Then, the operator sets up the welding equipment according to schedule A, at operation 20. Next, the operator performs weld #1, weld #2, and weld #3 using welding schedule A at operations 22, 24 and 26. Then, the operator stops welding operations and sets up the welding equipment according to schedule B at operation 30. Next, the operator performs weld #4 using welding schedule B at operation 32. Then, the operator checks the dimensions of the assembly at operation 40, and sets up the welding equipment according to schedule C at operation 50. Next, the operator performs weld #5 and weld #6 using welding schedule C at operations 52 and 54. After the welding operations are completed, the operator visually inspects the welded assembly at operation 60, and completes the welding job at operation 70.

Clearly, the method shown in FIG. 1 depends on the operator to correctly follow the predefined sequencing for performing welds and inspections, to accurately change between welding schedules (such as at operation 30), and to perform the welding itself. Errors in any of these responsibilities can result either in rework (if the errors are caught during inspection at operation 60) or a defective part being supplied to the end user. Further, this exemplary semi-automatic welding method hampers productivity, because the operator must spend time configuring and reconfiguring weld schedules.

The above problems demand an improvement in the related art system.

SUMMARY OF THE INVENTION

In accordance with an embodiment of the present invention, a welding system is provided that includes a first component that is configured to identify an operator within a welding work cell to perform a first welding procedure on a workpiece and a second welding procedure on the workpiece. In the embodiment, the welding system further includes a welding job sequencer component that is configured to select one or more welding sequences based on the identification of the operator, wherein the welding sequence defines at least a parameter and a welding schedule for the first welding procedure to create a first weld on the workpiece and the second welding procedure to create a second weld on the workpiece. Within the embodiment, the welding job sequencer component is further configured to utilize the welding sequence in the welding work cell to facilitate performing the first welding procedure and the second welding procedure for the identified operator.

In accordance with an embodiment of the present invention, a method is provided that includes at least the following steps: receiving an input from an operator, the input is a portion of biometric data of the operator; verifying an identity of the operator by comparing the input to a system authenticated input for the user; identifying a welding sequence the operator is authorized to perform, wherein the welding sequence defines a first welding procedure that includes a first parameter to create a first weld on a workpiece and a second welding procedure that includes a second parameter to create a second weld on the workpiece; monitoring at least one fixture for a workpiece within the welding work cell; verifying a location of the at least one fixture for the workpiece based on a location indicated in the welding sequence; and utilizing the welding sequence to automatically modify a welding equipment within the welding work cell without intervention from the operator creating at least one of the first weld or the second weld.

In accordance with an embodiment of the present invention, a welding system is provided that includes at least the following: means for receiving an input from an operator, the input is a portion of biometric data of the operator; means for verifying an identity of the operator by comparing the input to a system authenticated input for the user; means for receiving a wireless signal from a Radio Frequency Identification (RFID) tag that is affixed to a workpiece, wherein the wireless signal includes a portion of data that is used to identify a welding sequence for the workpiece; means for identifying the welding sequence the operator is to perform based on the wireless signal, wherein the welding sequence defines a one or more welding procedures that includes one or more parameters to create one or more welds on the workpiece; means for monitoring at least one fixture for a workpiece within the welding work cell; means for verifying a location of the at least one fixture for the workpiece based on a location indicated in the welding sequence; and means for employing the welding sequence for the welding work cell to perform one or more welds to assemble the workpiece by automatically adjusting a setting on a welding equipment within the welding work cell.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Embodiments of the invention relate to methods and systems that relate to evaluating one or more conditions or preliminary weld condition (e.g., pre-weld condition) related to a welding system and/or method that utilizes a welding sequence to perform two or more welds with respective welding schedules. In an embodiment, an operator registration is provided that verifies the operator and identifies welding sequences to which the operator is authorized (e.g., trained, experienced, and the like) to perform. In another embodiment, one or more fixture locations are monitored to determine whether a workpiece is accurately configured prior to a welding operation. In still another embodiment, locations on a workpiece can be displayed to assist an operator in performing two or more welds utilizing a welding sequence. Moreover, a wireless system communications a data signal to a welding work cell in which such data is used to identify a welding sequence.

According to an aspect of the invention, there is provided a semi-automatic welding work cell including a welding job sequencer that automatically selects a welding schedule for use by an operator in the semi-automatic welding work cell.

According to another aspect of the invention, there is provided a method of welding in a semi-automatic work cell, including automatically selecting a welding schedule for use by an operator in the semi-automatic welding work cell.

According to another aspect of the invention, there is provided a welding production line including at least one semi-automatic welding work cell, where the semi-automatic work cell includes a welding job sequencer that automatically selects a welding schedule for use by an operator therein.

According to another aspect of the invention, there is provided a method of monitoring a welding production line, including automatically selecting a welding schedule for use by an operator in a semi-automatic welding work cell.

The term "component" as used herein can be defined as a portion of hardware, a portion of software, or a combination thereof. A portion of hardware can include at least a processor and a portion of memory, wherein the memory includes an instruction to execute.

Figure 1:
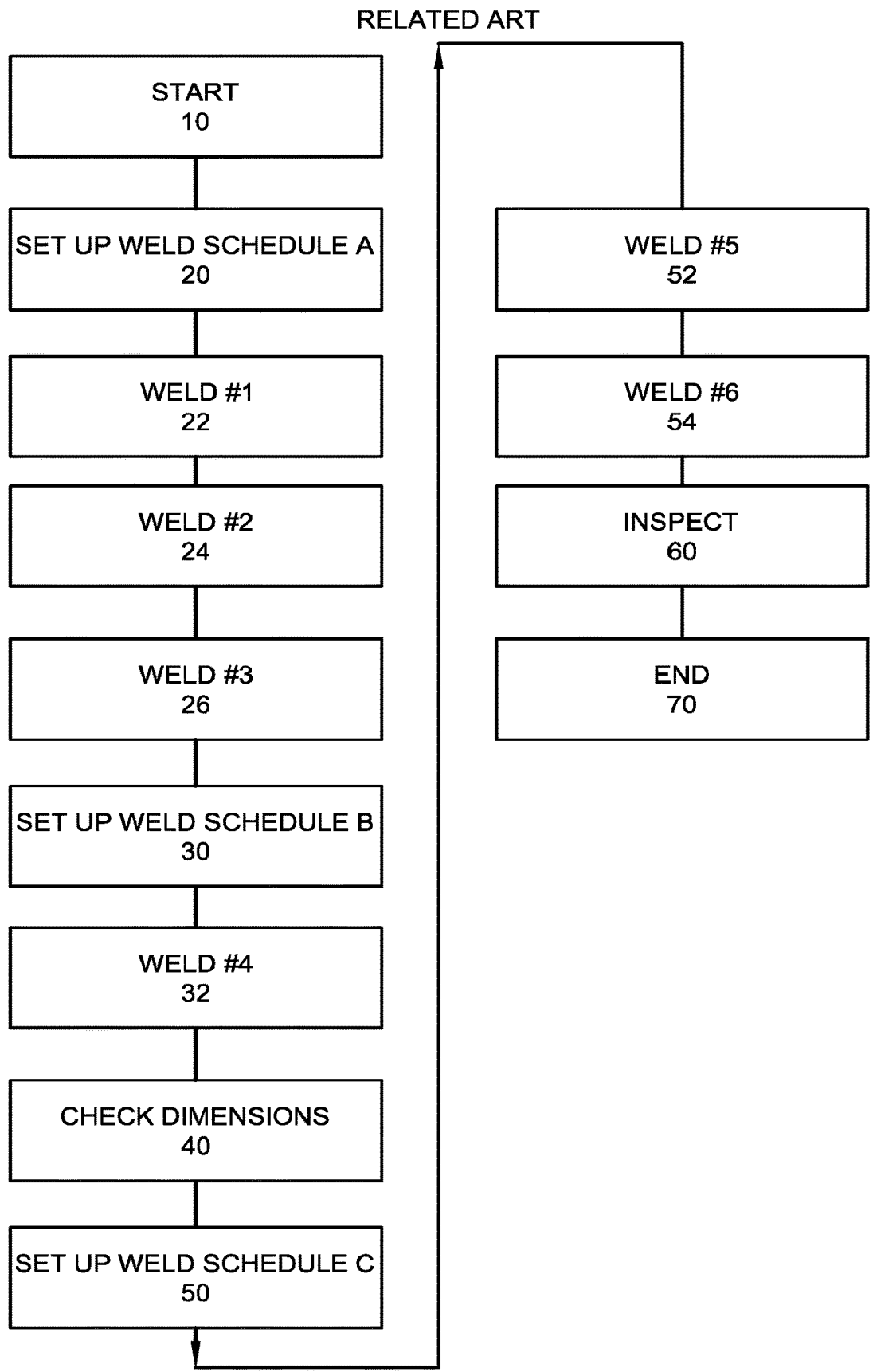
FIG. 1 illustrates a welding operation of the related art utilizing a semi-automatic welding work cell.
Figure 2:
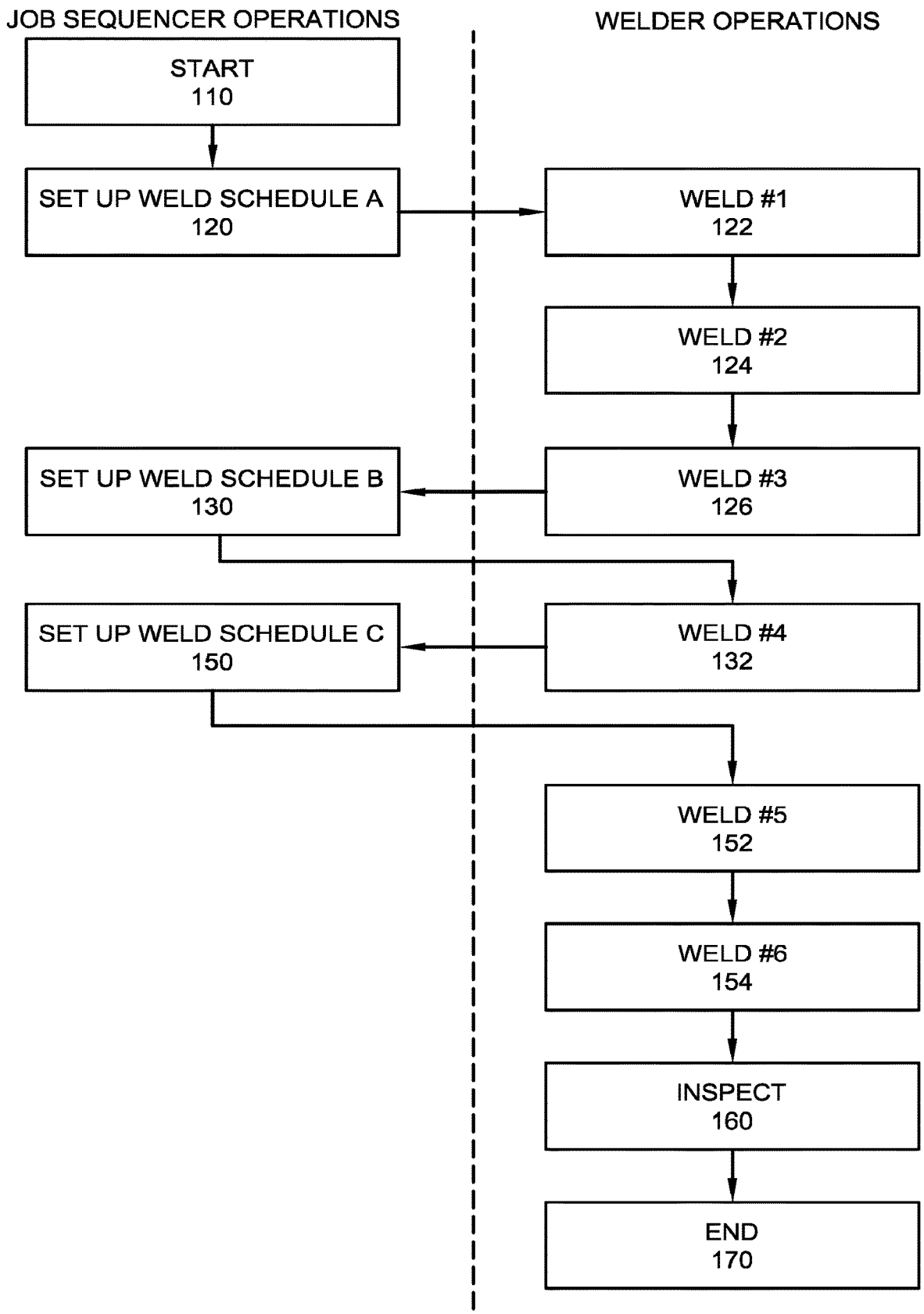
FIG. 2 illustrates a welding operation according to the invention utilizing a semi-automatic welding work cell.

The best mode for carrying out the invention will now be described for the purposes of illustrating the best mode known to the applicant at the time of the filing of this patent application. The examples and figures are illustrative only and not meant to limit the invention, which is measured by the scope and spirit of the claims. Referring now to the drawings, wherein the showings are for the purpose of illustrating an exemplary embodiment of the invention only and not for the purpose of limiting same, FIG. 2 is referenced. In an exemplary embodiment of the invention as illustrated in FIG. 2, a welding job sequencer is provided. The welding job sequencer improves the semi-automatic work cell of the related art by increasing the productivity of the semi-automatic work cell without compromising the number of weld schedules usable therein. The welding job sequencer accomplishes this improvement by implementing automatic changes in the semi-automatic work cell, and by providing the operator with an array of commands and instructions.

More specifically, in an exemplary embodiment, the welding job sequencer automatically selects and implements a function of the welding work cell. An example of such a function includes a particular weld schedule to be used with the semi-automatic work cell. In other words, the welding job sequencer may select a weld schedule to be used for a particular weld, and modify the settings of the semi-automatic work cell in accordance with the selected weld schedule, automatically for the operator (i.e., without the operator's specific intervention).

Additionally, in the exemplary embodiment, the welding job sequencer may automatically indicate a sequence of operations that the operator should follow to create a final welded assembly. In conjunction with the automatic selection of welding schedules, this indicated sequence allows an operator to follow the sequence to create a final welded part, without having to spend time adjusting, selecting, or reviewing each individual weld schedule and/or sequence.

Accordingly, since the welding job sequencer sets up the welding equipment and organizes the workflow, and since the operator only performs the welding operations themselves, the chance for error in the welding operation is greatly reduced, and productivity and quality are improved.

The exemplary embodiment is diagrammatically represented in FIG. 2. In FIG. 2, at operation 110, the welding job sequencer begins operation, and immediately sets the welding equipment to use weld schedule A (operation 120) and instructs the operator to perform welds #1, #2 and #3. Then, the operator performs welds #1, #2 and #3 using weld schedule A (operations 122, 124 and 126). Next, the welding job sequencer sets the welding equipment to use weld schedule B (operation 130), and instructs the operator to perform weld #4. Then the operator performs weld #4 using weld schedule B (operations 132). After completion of weld schedule B, the welding job sequencer sets the welding equipment to use weld schedule C (operation 150), and instructs the operator to perform welds #5 and #6, and to inspect the part. Then, the operator performs welds #5 and #6 (operations 152, and 154) using weld schedule C, and inspects the completed part to confirm that it is correct (operation 160). This inspection may include dimensional verification, visual defect confirmation, or any other type of check that might be needed. Further, operation 160 may include a requirement that the operator affirmatively indicate that the inspection is complete, such as by pressing an "OK" button, before it is possible to proceed to the next operation. Lastly, the welding job sequencer indicates that the welding operation is at an end (operation 170), and re-sets for the next operation.

Accordingly, as noted above, the sequencing and scheduling of welding operations is completed by the sequencer, and frees the operator to focus on performing welds according to instruction.

The welding job sequencer may select and implement a new function, such as the selection and implementation of weld schedules A, B and C shown in FIG. 2, based upon various variables or inputs. For example, the welding job sequencer may simply select new weld schedules based upon a monitoring of elapsed time since the beginning of the welding operations, or since the cessation of welding (such as the time after weld #3 in FIG. 2 above). Alternatively, the welding job sequencer may monitor the actions of the operator, compare the actions to the identified sequence of welds, and select new weld schedules appropriately. Still further, various combinations of these methods, or any other effective method, may be implemented, as long as the end effect is to provide an automatic selection and implementation of a function, such as the weld schedule, for use by the operator.

Parameters of the selected weld schedule may include such variables as welding process, wire type, wire size, WFS, volts, trim, which wire feeder to use, or which feed head to use, but are not limited thereto.

While the above description focuses on the selection of a weld schedule as a function which is automatically selected and implemented, the welding job sequencer is not limited to using only this function.

For example, another possible function that may be selected and implemented by the welding job sequencer is a selection of one of multiple wire feeders on a single power source in accordance with the weld schedule. This function provides an even greater variability in welding jobs capable of being performed by the operator in the semi-automatic work cell, since different wire feeders can provide a great variance of, for example, wire sizes and types.

Another example of a function compatible with the welding job sequencer is a Quality Check function. This function performs a quality check of the weld (either during welding or after the weld is completed) before allowing the job sequence to continue. The quality check can monitor various welding parameters and can pause the welding operation and alert the operator if an abnormality is detected. An example of a welding parameter measurable by this function would be arc data.

Another example of such a function would be a Repeat function. This function would instruct the operator to repeat a particular weld or weld sequence. An example of the use of this function includes when the Quality Check function shows an abnormality, or when multiple instances of the same weld are required.

Another example of such a function would be a Notify Welder function, which communicates information to the welder. This function would display information, give an audible signal, or communicate with the welder by some other means. Examples of use of this function include an indication to the operator that he is free to begin welding, or an indication that the operator should check some portion of the welded part for quality purposes.

Another example of such a function would be a Enter Job Information function. This function will require the welder to enter information, such as the part serial number, a personal ID number, or other special conditions before the job sequencer can continue. This information could also be read from a part or inventory tag itself through Radio Frequency Identification (RFID), bar code scanning, or the like. The welding job sequencer could then utilize the entered information for the welding operations. An example of the use of this function would be as a predicate to the entire welding operation, so as to indicate to the welding job sequencer which schedules and/or sequences should be selected.

A further example of such a function would be a Job Report function. This function will create a report on the welding job, which could include information such as: the number of welds performed, total and individual arc timing, sequence interruptions, errors, faults, wire usage, arc data, and the like. An example of the use of this function would be to report to a manufacturing quality department on the efficiency and quality of the welding processes.

A still further example of such a function would be a System Check function. This function will establish whether the welding job can continue, and could monitor such parameters as: wire supply, gas supply, time left in the shift (as compared to the required time to finish the job), and the like. The function could then determine whether the parameters indicate that there is enough time and/or material for the welding job to continue. This function would prevent down-time due to material depletion, and would prevent work-in-process assemblies from being delayed, which can lead to quality problems due to thermal and scheduling issues.

Further, as mentioned above, the welding job sequencer may select and implement a new function, based upon various variables or inputs. These variables and inputs are not particularly limited, and can even be another function. For example, another function compatible with the welding job sequencer is a Perform Welding Operation function. This function is designed to detect the actual welding performed by the operator, and to report that welding so that the welding job sequencer can determine whether to proceed with further operations. For example, this function can operate by starting when the operator pulls the trigger to start the welding operation, and finishing when the operator releases the trigger after the welding is complete, or after a predetermined period of time after it starts. This function could end when the trigger is released or it could be configured to automatically turn off after a period of time, a quantity of wire, or an amount of energy is delivered. This function may be used to determine when to select a new function, such as a new weld schedule, as discussed above.

Still further, various semi-automatic and/or robotic work cells can be integrated together on a single network, and the sequencing of welding steps at a single work-cell can be fully integrated into a complete production schedule, which itself can be modified as needed to track variations in the production schedule. Sequencing and/or scheduling information can also be stored in a database, be stored by date as archival information, and be accessed to provide various production reports In an embodiment, a semi-automatic welding work cell for welding an assembly defined by a plurality of welds can be provided, the plurality of welds being defined by at least two weld schedules can include welding equipment for use by a welding operator to perform said plurality of welds and complete the assembly with said welding equipment having a plurality of functions. In the embodiment, the work cell can include a welding job sequencer that automatically selects a welding schedule for use by an operator in the semi-automatic welding work cell. In the embodiment, the welding job sequencer can select the welding schedule according to an elapsed time. In an embodiment, the welding job sequencer can detect when the operator is conducting a welding operation, and selects the welding schedule based upon that detection. In the embodiment, the welding job sequencer can detect when the operator is conducting a welding operation, and the welding job sequencer selects the welding schedule according to an amount of welding wire supplied for the welding operation. In the embodiment, the welding job sequencer can detect when the operator is conducting a welding operation, and the welding job sequencer selects the welding schedule according to an amount of energy supplied for the welding operation. In the embodiment, the welding schedule includes information about at least one of a welding process, wire type, wire size, WFS, volts, trim, wire feeder to use, or feed head to use.

In an embodiment, the welding work cell can include the welding job sequencer which select and implements at least one of a plurality of functions to define at least a first weld schedule and a second weld schedule from the at least two weld schedules so as to organize a workflow for creating the welded assembly and indicate to the welding operator a sequence of working operations for completing the assembly. In the embodiment, the welding job sequencer can automatically modify the welding equipment in accordance with the workflow and sequence of the welding operations without the welding operator intervening.

In the embodiment, the second weld schedule is defined according to an elapsed time of the first weld schedule. In the embodiment, the at least one function detects completion of said first weld schedule by said operator and automatically changes from said first weld schedule to said second weld schedule. In the embodiment, at least one function detects when the operator is conducting said first weld schedule, and said second weld schedule is defined according to an amount of welding wire supplied for said first weld schedule. In the embodiment, at least one function detects when the operator is conducting said first weld schedule, and said second weld schedule is defined according to an amount of energy supplied for said first weld schedule. In the embodiment, the at least one first weld set up parameter and said at least one second weld set up parameter comprise at least one of a welding process, wire type, wire size, WFS, volts, trim, wire feeder to use, or feed head to use. In the embodiment, at least one first weld set up parameter and said at least one second weld set up parameter comprise a feeder for use by an operator in the semi-automatic welding work cell. In the embodiment, at least one function monitors quality measurables of said weld assembly, wherein the quality measurables comprise at least information about an arc used to form the weld created by the operator In the embodiment, at least one function indicates information to the operator in the semiautomatic welding work cell. In the embodiment, at least one function accepts job information comprising at least a part ID number, operator ID number, or welding instructions. In the embodiment, at least one function produces a job report comprising at least one of a number of welds preformed, total arc time, individual arc time, sequence interruptions, errors, faults, wire usage, arc data. In the embodiment, at least one function includes a system check of said cell, the system check comprising at least a detection of wire supply, gas supply, and time.

In the embodiment, the welding job sequencer can select a welding sequence for use by the operator in the semi-automatic welding work cell. In the embodiment, the welding job sequencer can indicate the selected welding sequence to the operator in the semi-automatic welding work cell. In the embodiment, the welding job sequencer can select a wire feeder for use by an operator in the semi-automatic welding work cell. In the embodiment, the welding job sequencer can monitor quality measurables of a weld created by the operator, wherein the quality measurables comprise at least information about an arc used to form the weld created by the operator. In the embodiment, the welding job sequencer can indicate information to the operator in the semi-automatic welding work cell. In the embodiment, the welding job sequencer can accept job information comprising at least a part ID number, operator ID number, or welding instructions. In the embodiment, the welding job sequencer can produce a job report comprising at least one of a number of welds preformed, total arc time, individual arc time, sequence interruptions, errors, faults, wire usage, arc data. In the embodiment, the welding job sequencer can perform a system check comprising at least a detection of wire supply, gas supply, and time.

In an embodiment, a method of welding in a semi-automatic work cell can be provided that includes automatically selecting a welding schedule for use by an operator in the semi-automatic welding work cell. In the embodiment, the automatic selection can be performed after an elapsed time. In the embodiment, the method can include detecting when the operator is conducting a welding operation, wherein the automatic selection is performed based upon that detection. In the embodiment, the method can include detecting when the operator is conducting a welding operation, wherein the automatic selection is performed according to an amount of welding wire supplied for the welding operation. In the embodiment, the method can include detecting when the operator is conducting a welding operation, wherein the automatic selection is performed according to an amount of energy supplied for the welding operation. In the embodiment, the welding schedule can include information about at least one of a welding process, wire type, wire size, WFS, volts, trim, wire feeder to use, or feed head to use.

In the embodiment, the method can include selecting a welding sequence for use by the operator in the semi-automatic welding work cell. In the embodiment, the method can include indicating the selected welding sequence to the operator in the semi-automatic welding work cell. In the embodiment, the method can include selecting a wire feeder for use by an operator in the semi-automatic welding work cell. In the embodiment, the method can include monitoring quality measurables of a weld created by the operator, wherein the quality measurables comprise at least information about an arc used to form the weld created by the operator. In the embodiment, the method can include indicating information to the operator in the semi-automatic welding work cell. In the embodiment, the method can include accepting job information comprising at least a part ID number, operator ID number, or welding instructions. In the embodiment, the method can include producing a job report comprising at least one of a number of welds performed, total arc time, individual arc time, sequence interruptions, errors, faults, wire usage, arc data. In the embodiment, the method can include performing a system check comprising at least a detection of wire supply, gas supply, and time.

In an embodiment, a welding production line is provided with at least one semi-automatic welding work cell, wherein the semi-automatic work cell that includes a welding job sequencer that automatically selects a welding schedule for use by an operator therein. In the embodiment, the welding production line includes a monitoring system that communicates with the welding job sequencer to direct the welding job sequencer to automatically select the welding schedule for use by the operator therein.

In an embodiment, a method of monitoring a welding production line is provided that includes automatically selecting a welding schedule for use by an operator in a semi-automatic welding work cell. In the embodiment, the method can include directing the welding job sequencer to automatically select the welding schedule for use by the operator therein.

In an embodiment, a semi-automatic welding work cell is provided that includes a welding job sequencer that automatically selects a welding schedule for use by an operator in the semi-automatic welding work cell. The automatic selection may be by way of elapsed time, a detection of welding operations, a detection of the amount of welding wire supplied for the welding operation, or a detection of the amount of energy supplied for the welding operation.

In an embodiment, a method of welding in a semi-automatic work cell having welding equipment and a welding job sequencer to complete an assembly defined by a plurality of welds can be provided in which the plurality of welds can be defined by at least two weld schedules. The embodiment can include at least the steps of the following: implementing a welding equipment function with the welding job sequencer to define from the at least two weld schedules a first weld schedule having at least one first weld set up parameter and at least one first weld instruction and a second weld schedule having at least one second weld set up parameter and at least one second weld instruction, at least one of the said second weld set up parameter and said second weld instruction is different from said first weld set up parameter and said first weld instruction; indicating to a welding operator a sequence of welding operations for completing the assembly based on said first and second weld schedules; and automatically modifying said welding equipment in accordance with said sequence of welding operations for completing the assembly based on said first and second weld schedules.

In the embodiment, the method can include defining said second weld schedule is performed after an elapsed time defined by said first weld schedule. In the embodiment, the method can include detecting when the operator is conducting said first weld schedule, wherein defining said second schedule is based upon that detection. In the embodiment, defining said first and second weld schedules can include defining an amount of welding wire supplied for the welding operation. In the embodiment, defining said second weld schedule is according to an amount of energy supplied for the welding operation for said first weld schedule. In the embodiment, defining at least one of the first and second weld schedules can include selecting at least one of a welding process, wire type, wire size, WFS, volts, trim, wire feeder to use, or feed bead to use. In an embodiment, defining at least one of the first and second weld schedules can include selecting a wire feeder for use by an operator in the semi-automatic welding work cell. In an embodiment, the method can include monitoring quality measurables of a weld created by the operator, wherein the quality measurables comprise at least information about an arc used to form the weld created by the operator. In an embodiment, the method can include indicating information to the operator in the semi-automatic welding work cell. In an embodiment, the method can include accepting job information comprising at least a part ID number, operator ID number, or welding instructions. In an embodiment, the method can include producing a job report comprising at least one of a number of welds performed, total arc time, individual arc time, sequence interruptions, errors, faults, wire usage, arc data performing a system check comprising at least a detection of wire supply, gas supply, and time.

In an embodiment, a welding production line is provided that includes at least one semi-automatic welding work cell for welding an assembly defined by a plurality of welds, the plurality of welds being defined by at least weld schedules, the semi-automatic welding work cell including welding equipment for use by a welding operator to perform the plurality of welds and complete the assembly, the welding equipment having a plurality of functions. In the embodiment, the production line can include a welding job sequencer which selects and implements at least one of the plurality of functions to define at least a first and a second weld schedule in a sequence of welding operations from the at least two weld schedules to be used by said welding operator for completing the weld assembly. In an embodiment, the production line can include said first weld schedule contains at least one first weld set up parameter and at least one first weld instruction for said welding operator and said second weld schedule contains at least one second weld set up parameter and at least one second weld instruction for said welding operator, at least one of said first weld set up parameter and said first weld instruction is different from said second weld set up parameter and said second weld instruction, said welding job sequencer automatically modifying said welding equipment in accordance with said sequence of operations without said welding operator intervention. In an embodiment, the production line can include a monitoring system in communication with the welding job sequencer to monitor completion of the at least one weld instruction of each of the first and second weld schedule.

In an embodiment, a method for monitoring a welding production line in at least one semi-automatic welding work cell for use by a welding operator to complete an assembly defined by a plurality of welds, the plurality of welds being defined by at least two weld schedules, the semi-automatic welding work cell including welding equipment and a welding job sequencer. The method can include at least the following steps: defining at least a first and a second weld schedule in a sequence of welding operations from the at least two weld schedules with the welding job sequencer said first weld schedule having at least one first weld set up parameter and at least one first weld instruction and said second weld schedule defining at least one second weld set up parameter and at least one second weld instruction with at least one of said second weld set up parameter and said second weld instruction being different from said first weld set up parameter and said first weld instruction; determining completion of said first weld schedule by said welding operator; automatically modifying the welding equipment in accordance with said second weld schedule without said welding operator intervention; and monitoring the welding operations. In the embodiment, the method can include automatically modifying the welding equipment in accordance with said second weld schedule is based on said completion of said first weld schedule.

In an embodiment, a semi-automatic welding work cell for use by an operator is provided. The embodiment can include welding equipment having a plurality of functions for performing welds by the operator and a welding job sequencer selecting from the plurality of functions to set up and organize the welding equipment for the operator. The embodiment can include the plurality of functions including: a weld schedule function defined by a sequence of weld operations; a notify function to instruct the operator to perform the weld schedule; and a quality check function to monitor at least one weld operation of the sequence of weld operations.

In the embodiment, the quality check function performs a quality check on a weld completed by the at least one weld operation. In the embodiment, the quality check function monitors the at least one weld operation during the at least one weld operation. In the embodiment, the quality check function monitors the at least one weld operation after completion of the at least one weld operation. In the embodiment, the weld schedule function defines a plurality of weld schedules, each weld schedule having a first weld operation and at least a second weld operation. In the embodiment, the quality check function monitors the at least one weld operation before allowing the sequence of weld operations to continue. In the embodiment, the quality check function detects an abnormality, the sequencer pauses the sequence of weld operations and the notify function alerts the operator of the abnormality.

Figure 3:
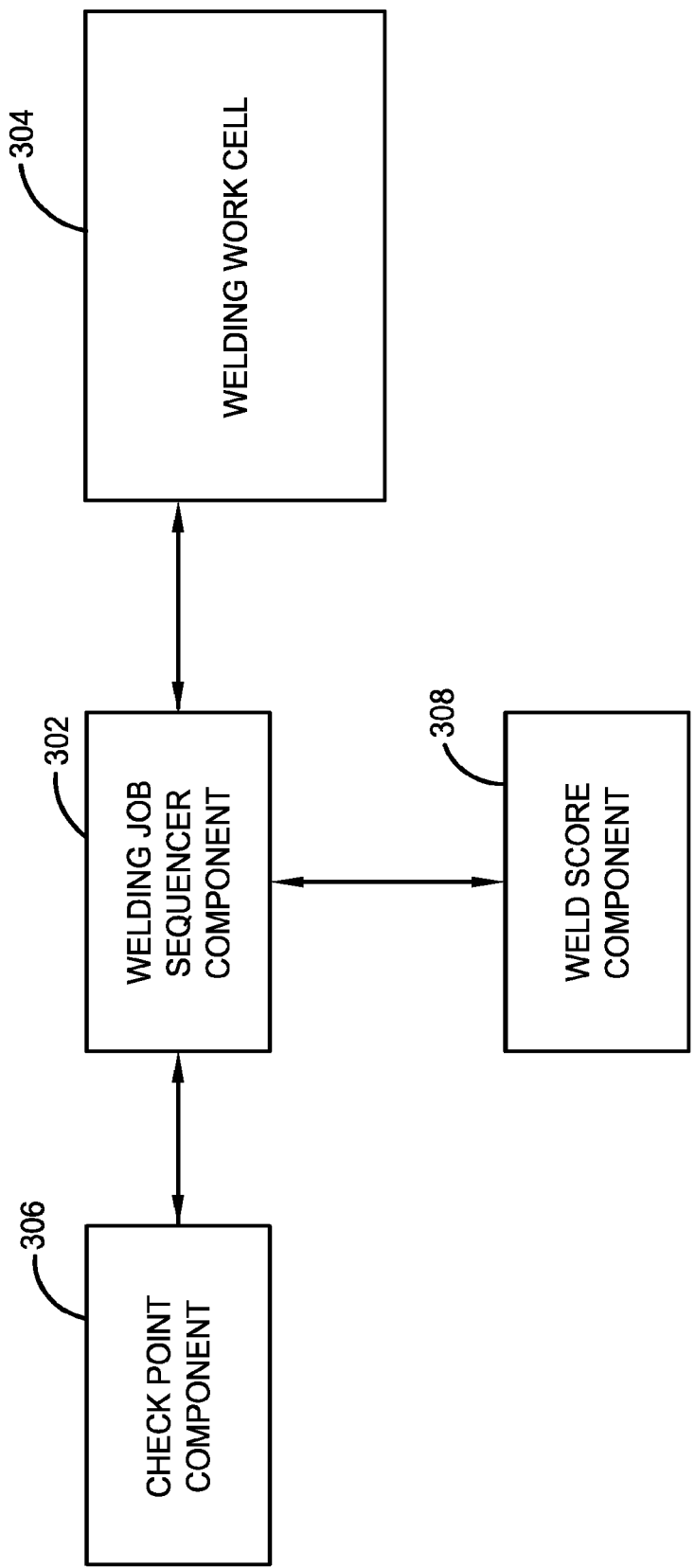
FIG. 3 is a block diagram illustrating a welding system that utilizes a welding job sequencer component to configure welding equipment for two or more weld operations to assembly a workpiece.

FIG. 3 is a schematic block diagram of an exemplary embodiment of welding system 300 that utilizes welding job sequencer component 302 (also referred to as welding job sequencer) to configure welding equipment for two or more weld operations to assembly a workpiece. Welding job sequencer component 302 that is configured to implement a welding sequence that includes settings, configurations, and/or parameters to perform two or more welding procedures on a workpiece. In particular, welding job sequencer component 302, as discussed above as welding job sequencer, automatically configures welding equipment to create two or more welds that include two or more welding schedules. Moreover, welding job sequencer component 302 utilizes the welding sequence to aid an operator to perform the two or more welds. As discussed above, welding job sequencer component 302 can be utilized with welding work cell 304 that is semi-automatic. However, it is to be appreciated and understood that welding job sequencer component 302 can be implemented in a suitable welding environment or system that includes at least welding equipment and an operator to facilitate creating one or more welds.

Welding system 300 further includes check point component 306 that is configured to monitor a welding process and/or a welding operator in real time. For instance, the welding process is monitored in real time to detect at least one of a welding parameter (e.g., voltage, current, among others), a welding schedule parameter (e.g., welding process, wire type, wire size, WFS, volts, trim, wire feeder to use, feed head to use, among others), a weld on a workpiece as the weld is created, a movement of an operator, a position of a welding tool, a position or location of a welding equipment, a position or location of an operator, sensor data (e.g., video camera, image capture, thermal imaging device, heat sensing camera, temperature sensor, among others), and the like. Check point component 306 includes an alert system (not shown) that can communicate an alert or notification to indicate a status of the real time monitoring. In an embodiment, check point component 306 can utilize thresholds, ranges, limits, and the like for the real time monitoring to precisely identify a abnormality with welding system 300. Furthermore, check point component 306 can communicate an alert or notification to welding work cell 304 or the operator to at least one of stop the welding procedure, continue with the welding procedure, pause the welding procedure, terminate the welding procedure, or request approval of the welding procedure. In an embodiment, check point component 306 can store monitoring data (e.g., video, images, results, sensor data, and the like) in at least one of a server, a data store, a cloud, a combination thereof, among others.

Weld score component 308 is included with welding system 300 and is configured to evaluate a weld created by an operator within welding work cell 304 upon completion of such weld. Weld score component 308 provides a rating or score for the completed weld to facilitate implementing a quality control on the workpiece and/or assembly of the workpiece. For instance, weld score component 308 can alert a quality inspection upon completion, provide data collection of a job (e.g., assembly of workpiece, weld on workpiece, among others), and the like. In an embodiment, an in-person quality inspection can be performed upon completion of a portion of the assembly (e.g., completion of a weld, completion of two or more welds, completion of assembly, among others). In another embodiment, weld score component 308 can utilize a sensor to collect data (e.g., video camera, image capture, thermal imaging device, heat sensing camera, temperature sensor, among others) to determine approval of the job. For instance, a quality inspection can be performed remotely via video or image data collected upon completion of a job.

It is to be appreciated that welding job sequencer component 302 can be a stand-alone component (as depicted), incorporated into welding work cell 304, incorporated into check point component 306, incorporated into weld score component 308, or a suitable combination thereof. Additionally, as discussed below, welding job sequencer component 302 can be a distributed system, software-as-a-service (SaaS), a cloud-based system, or a combination thereof. Further, it is to be appreciated and understood that check point component 306 can be a stand-alone component (as depicted), incorporated into welding work cell 304, incorporated into welding job sequencer component 302, incorporated into weld score component 308, or a suitable combination thereof. Additionally, check point component 306 can be a distributed system, software-as-a-service (SaaS), a cloud-based system, or a combination thereof. Moreover, it is to be appreciated and understood that weld score component 308 can be a stand-alone component (as depicted), incorporated into welding work cell 304, incorporated into welding job sequencer component 302, incorporated into check point component 306, or a suitable combination thereof. Additionally, weld score component 308 can be a distributed system, software-as-a-service (SaaS), a cloud-based system, or a combination thereof.

Figure 4:
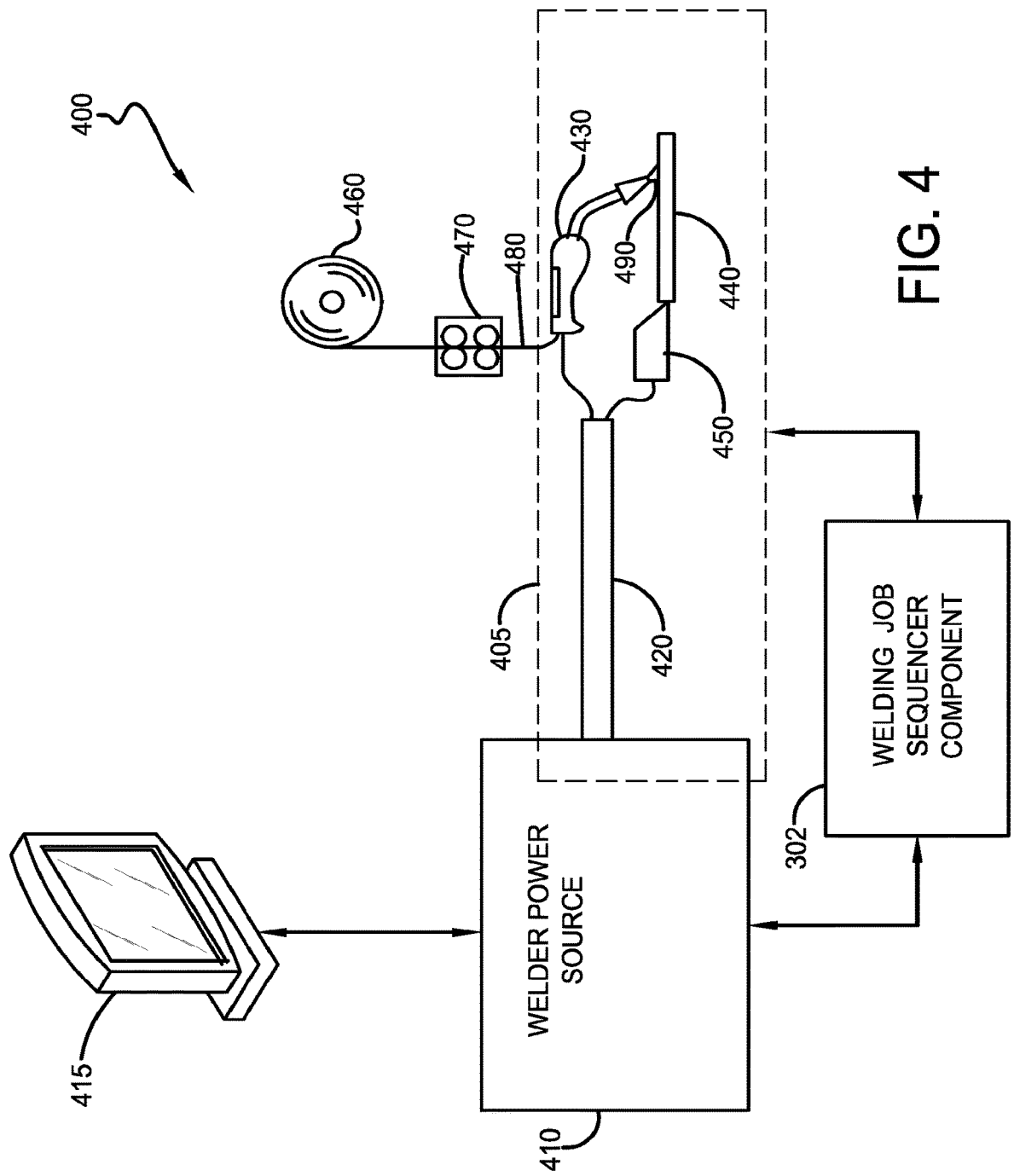
FIG. 4 is a block diagram illustrating a welding system that utilizes a welding job sequencer component.

FIG. 4 illustrates a schematic block diagram of an exemplary embodiment of welding system 400 including welding circuit path 405. It is to be appreciated that welding system 400 is also referred to as the welding work cell, wherein the welding work cell and/or welding system 400 can produce welds or welded parts. Welding system 400 includes welder power source 410 and display 415 operationally connected to welder power source 410. Alternatively, display 415 may be an integral part of welder power source 410. For instance, display 415 can be incorporated into welder power source 410, a stand-alone component (as depicted), or a combination thereof. Welding system 100 further includes welding cable 120, welding tool 430, workpiece connector 450, spool of wire 460, wire feeder 470, wire 480, and workpiece 440. Wire 480 is fed into welding tool 430 from spool 460 via wire feeder 470, in accordance with an embodiment of the present invention. In accordance with another embodiment of the present invention, welding system 400 does not include spool of wire 460, wire feeder 470, or wire 480 but, instead, includes a welding tool comprising a consumable electrode such as used in, for example, stick welding. In accordance with various embodiments of the present invention, welding tool 430 may include at least one of a welding torch, a welding gun, and a welding consumable.

Welding circuit path 405 runs from welder power source 410 through welding cable 420 to welding tool 430, through workpiece 440 and/or to workpiece connector 450, and back through welding cable 420 to welder power source 110. During operation, electrical current runs through welding circuit path 405 as a voltage is applied to welding circuit path 405. In accordance with an exemplary embodiment, welding cable 420 comprises a coaxial cable assembly. In accordance with another embodiment, welding cable 420 comprises a first cable length running from welder power source 410 to welding tool 430, and a second cable length running from workpiece connector 450 to welder power source 410.

Welding system 400 includes welding job sequencer component 302 (as described above). Welding job sequencer component 302 is configured to interact with a portion of welding system 400. For instance, welding job sequencer component 302 can interact with at least the power source 410, a portion of welding circuit path 405, spool of wire 460, wire feeder 470, or a combination thereof. Welding job sequencer component 302 automatically adjusts one or more elements of welding system 400 based on a welding sequence, wherein the welding sequence is utilized to configure welding system 400 (or an element thereof) without operator intervention in order to perform two or more welding procedures with respective settings or configurations for each welding procedure.

In an embodiment, welding job sequencer component 302 employs a welding sequence to automatically configure welding equipment. It is to be appreciated that welding system 400 or welding work cell can employ a plurality of welding sequences for assembly of one or more workpieces. For instance, a workpiece can include three (3) welds to complete assembly in which a first welding sequence can be used for the first weld, a second welding sequence can be used for the second weld, and a third welding sequence can be used for the third weld. Moreover, in such example, the entire assembly of the workpiece including the three (3) welds can be referenced as a welding sequence. In an embodiment, a welding sequence that includes specific configurations or steps can further be included within a disparate welding sequence (e.g., nested welding sequence). A nested welding sequence can be a welding sequence that includes a welding sequence as part of the procedure. Moreover, the welding sequence can include at least one of a parameter, a welding schedule, a portion of a welding schedule, a step-by-step instruction, a portion of media (e.g., images, video, text, and the like), a tutorial, among others. In general, the welding sequence can be created and employed in order to guide an operator through welding procedure(s) for specific workpieces without the operator manually setting welding equipment to perform such welding procedures. The subject innovation relates to creating a welding sequence and/or modifying a welding sequence.

One or more welder power source(s) (e.g., welder power source 410) aggregates data respective to a respective welding process to which the welder power source is providing power to implement. Such collected data relates to each welder power source and is herein referred to as "weld data." Weld data can include welding parameters and/or information specific to the particular welding process the welder power source is supplying power. For instance, weld data can be an output (e.g., a waveform, a signature, a voltage, a current, among others), a weld time, a power consumption, a welding parameter for a welding process, a welder power source output for the welding process, and the like. In an embodiment, weld data can be utilized with welding job sequencer component 302. For example, weld data can be set by a welding sequence. In another example, weld data can be used as a feedback or a feedforward loop to verify settings.

In one embodiment, welding job sequencer component 302 is a computer operable to execute the disclosed methodologies and processes, including methods 1100 and 1200 described herein. In order to provide additional context for various aspects of the present invention, the following discussion is intended to provide a brief, general description of a suitable computing environment in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and/or software. Generally, program modules include routines, programs, components, data structures, etc., that perform particular tasks or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices. For instance, a remote database, a local database, a cloud-computing platform, a cloud database, or a combination thereof can be utilized with welding job sequencer 302.

Welding job sequencer 302 can utilize an exemplary environment for implementing various aspects of the invention including a computer, wherein the computer includes a processing unit, a system memory and a system bus. The system bus couples system components including, but not limited to the system memory to the processing unit. The processing unit may be any of various commercially available processors. Dual microprocessors and other multi-processor architectures also can be employed as the processing unit.

The system bus can be any of several types of bus structure including a memory bus or memory controller, a peripheral bus and a local bus using any of a variety of commercially available bus architectures. The system memory can include read only memory (ROM) and random access memory (RAM). A basic input/output system (BIOS), containing the basic routines that help to transfer information between elements within welding job sequencer 302, such as during start-up, is stored in the ROM.

Welding job sequencer 302 can further include a hard disk drive, a magnetic disk drive, e.g., to read from or write to a removable disk, and an optical disk drive, e.g., for reading a CD-ROM disk or to read from or write to other optical media. Welding job sequencer 302 can include at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by welding job sequencer 302.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, Radio Frequency (RF), Near Field Communications (NFC), Radio Frequency Identification (RFID), infrared, and/or other wireless media. Combinations of any of the above should also be included within the scope of computer readable media.

A number of program modules may be stored in the drives and RAM, including an operating system, one or more application programs, other program modules, and program data. The operating system in welding job sequencer 302 can be any of a number of commercially available operating systems.

In addition, a user may enter commands and information into the computer through a keyboard and a pointing device, such as a mouse. Other input devices may include a microphone, an IR remote control, a track ball, a pen input device, a joystick, a game pad, a digitizing tablet, a satellite dish, a scanner, or the like. These and other input devices are often connected to the processing unit through a serial port interface that is coupled to the system bus, but may be connected by other interfaces, such as a parallel port, a game port, a universal serial bus ("USB"), an IR interface, and/or various wireless technologies. A monitor (e.g., display 415), or other type of display device, may also be connected to the system bus via an interface, such as a video adapter. Visual output may also be accomplished through a remote display network protocol such as Remote Desktop Protocol, VNC, X-Window System, etc. In addition to visual output, a computer typically includes other peripheral output devices, such as speakers, printers, etc.

A display (in addition or in combination with display 415) can be employed with welding job sequencer 302 to present data that is electronically received from the processing unit. For example, the display can be an LCD, plasma, CRT, etc. monitor that presents data electronically. Alternatively or in addition, the display can present received data in a hard copy format such as a printer, facsimile, plotter etc. The display can present data in any color and can receive data from welding job sequencer 302 via any wireless or hard wire protocol and/or standard. In another example, welding job sequencer 302 and/or system 400 can be utilized with a mobile device such as a cellular phone, a smart phone, a tablet, a portable gaming device, a portable Internet browsing device, a Wi-Fi device, a Portable Digital Assistant (PDA), among others.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

Alternatively or in addition, a local or cloud (e.g., local, cloud, remote, among others) computing platform can be utilized for data aggregation, processing, and delivery. For this purpose, the cloud computing platform can include a plurality of processors, memory, and servers in a particular remote location. Under a software-as-a-service (SaaS) paradigm, a single application is employed by a plurality of users to access data resident in the cloud. In this manner, processing requirements at a local level are mitigated as data processing is generally done in the cloud, thereby relieving user network resources. The software-as-a-service application allows users to log into a web-based service (e.g., via a web browser) which hosts all the programs resident in the cloud.

Figure 5:
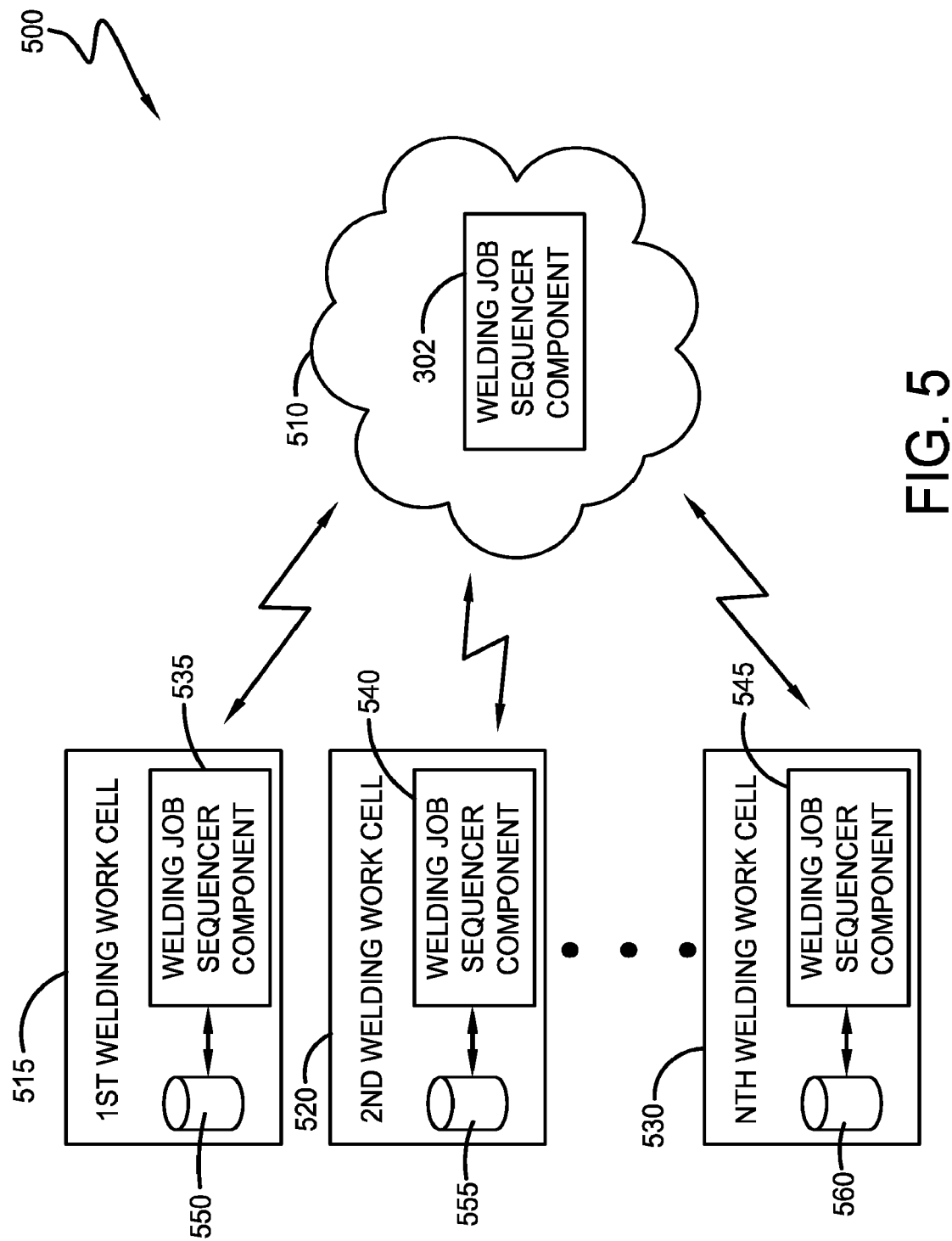
FIG. 5 is a block diagram illustrating a distributed welding environment with a plurality of welding work cells that interface with a welding job sequencer component via a local, remote, or cloud database.

Turning to FIG. 5, system 500 illustrates a welding environment with a plurality of welding work cells via a local, remote, or cloud database. System 500 includes a plurality of welding work cells such as first welding work cell 515, second welding work cell 520 to Nth welding work cell 530, where N is a positive integer. In an embodiment, each welding work cell includes a welding job sequencer component 535, 540, and 545, that is used to implement a welding schedule(s) to each welding work cell as well as or in the alternative to an enterprise-wide welding operation(s) and/or enterprise-wide welding work cell. Welding sequence(s) from each welding job sequencer component 535, 540, and 545 is received from the local or cloud database (e.g., local database, cloud database, remote database, among others) computing platform 510.

In an embodiment, each welding work cell further includes a local data store. For instance, first welding work cell 515 includes welding job sequencer component 535 and data store 550, second welding work cell 520 includes welding job sequencer component 540 and data store 555, and Nth welding work cell 530 includes welding job sequencer component 545 and data store 560. It is to be appreciated that system 500 includes welding job sequencer 302 hosted by computing platform 510 in which each welding work cell includes a distributed and respective welding job sequencer component. Yet, it is to be understood that welding job sequencer 302 (and distributed welding job sequencer components 535, 540, and 545) can be a stand-alone component in each welding work cell or a stand-alone component in the computing platform 510.

Each welding work cell can include a respective data store that stores a portion of at least one welding sequence. For instance, welding sequences related to a welding process A is employed at one or more welding work cell. The welding sequence is stored in a respective local data store (e.g., data stores 550, 555, and 560). Yet, it is to be appreciated and understood that each welding work cell can include a local data store (as depicted), a collective and shared remote data store, a collective and shared local data store, a cloud data store hosted by computing platform 510, or a combination thereof. A "data store" or "memory" can be, for example, either volatile memory or nonvolatile memory, or can include both volatile and nonvolatile memory. The data store of the subject systems and methods is intended to comprise, without being limited to, these and other suitable types of memory. In addition, the data store can be a server, a database, a hard drive, a flash drive, an external hard drive, a portable hard drive, a cloud-based storage, a solid-state drive, and the like.

For instance, welding job sequencer component 302 can manage each welding job sequencer component 535, 540, 545 in each welding work cell 515, 520, 530. In another embodiment, the communications can be transmitted from the welding job sequencer 302 to each welding work cell (e.g., each welding job sequencer component). In another embodiment, the communications can be received from each welding work cell (e.g., each welding job sequencer component) from the welding job sequencer component 302. For instance, a welding sequence can be used with $1^{st}$ welding work cell 515 and communicated directly to a disparate welding work cell or via computing platform 510.

Figure 6:
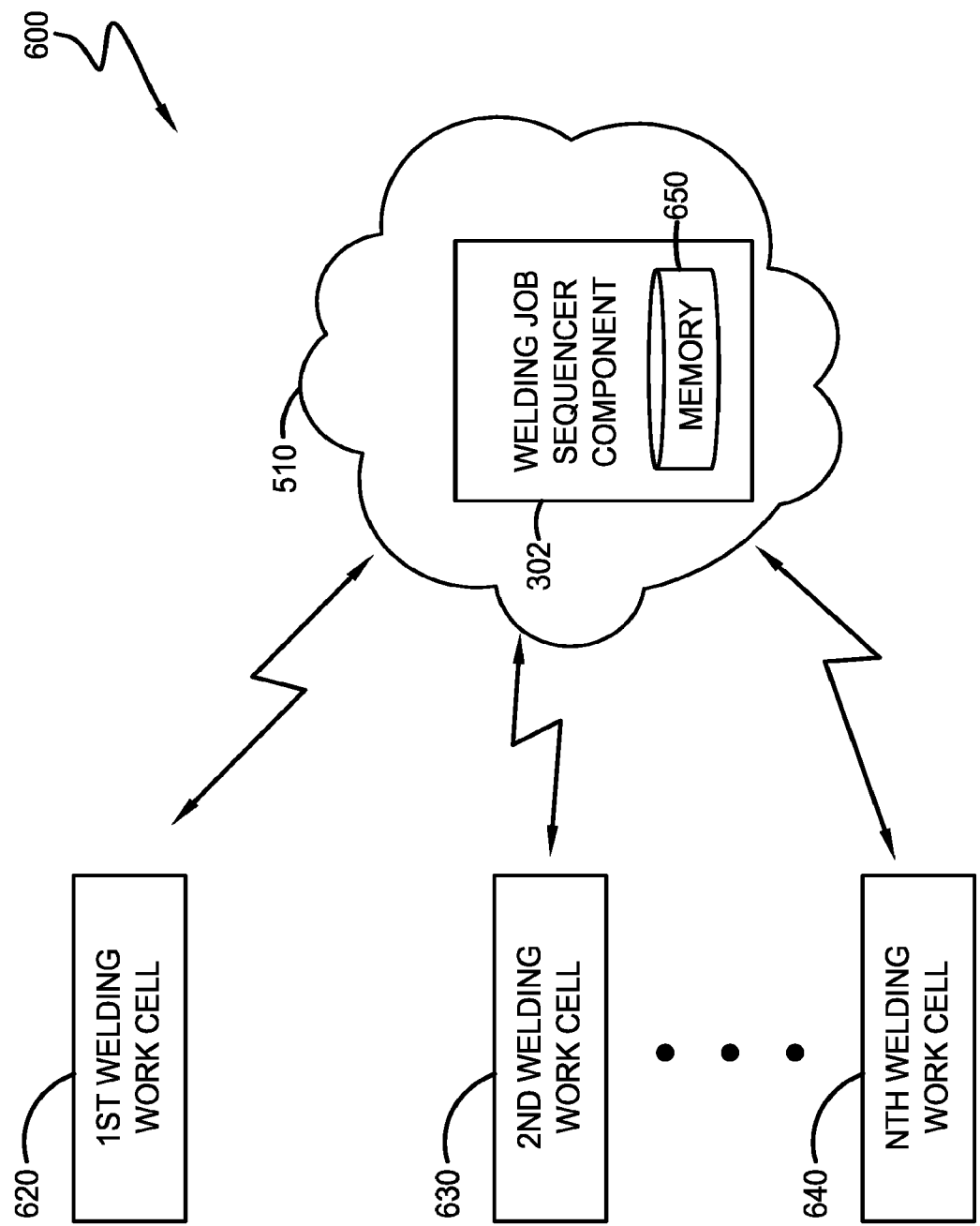
FIG. 6 is a block diagram illustrating a welding system that includes a plurality of welding work cells in which welding work cells are managed by a cloud-based welding job sequencer component.

FIG. 6 illustrates welding system 600 that includes a plurality of welding work cells in which welding job sequencer component 302 is hosted with computing platform 510 to utilize one or more welding sequences to configure welding equipment within one or more welding systems, welding environments, and/or welding work cells. Welding system 600 includes a local or cloud-based welding job sequencer component 302 hosted in computing platform 510. Welding job sequencer component 302 can utilize a welding sequence with a number of welding work cell. For instance, welding system 600 can a number of welding work cells such as, but not limited to, $1^{st}$ welding work cell 620, $2^{nd}$ welding work cell 630, to Nth welding work cell, where N is a positive integer. It is to be appreciated that the locality of the welding job sequencer component 302 is in relation to each $1^{st}$ welding work cell 620, $2^{nd}$ welding work cell 630, and/or Nth welding work cell 640.

In an embodiment, welding job sequencer 302 communicates one or more welding sequence to a target welding work cell, wherein the target welding work cell is a welding work cell that is to utilize the communicated welding sequence. Yet, in another embodiment, welding job sequencer 302 utilizes memory 650 hosted by computing platform 510 in which one or more welding sequences are stored. Yet, the stored welding sequence can be related or targeted to one or more welding work cells regardless of a storage location (e.g., local, cloud, remote, among others).

Figure 7:
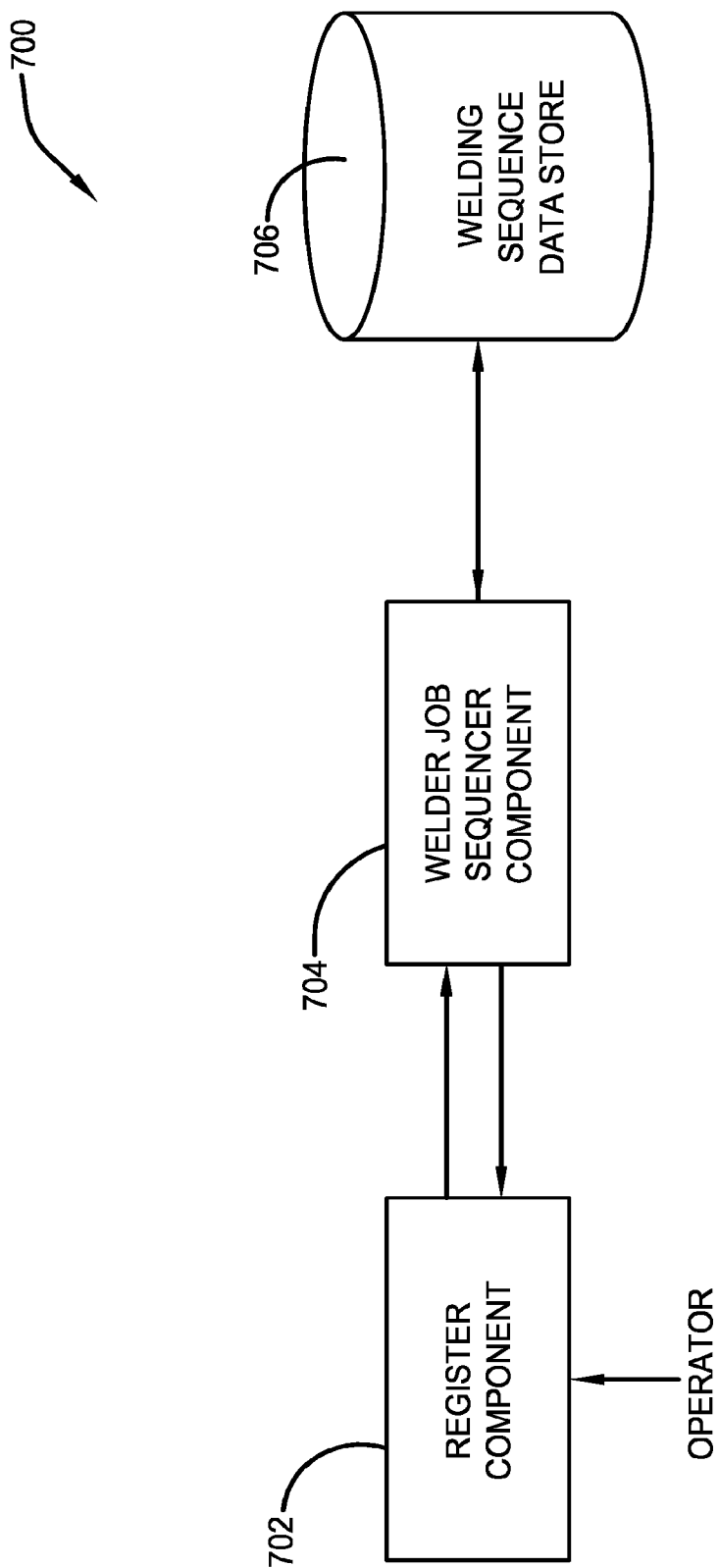
FIG. 7 is a block diagram illustrating a system that identifies an operator that is to perform a welding procedure with a welding sequence.

FIG. 7 illustrates system 700 that identifies an operator that is to perform a welding procedure with a welding sequence. System 700 includes register component 702 that is configured to receive input from an operator, wherein the input authorizes the operator to utilize at least one of a welding sequence and/or welding equipment to perform a welding procedure. In an embodiment, the operator can be authorized to use welding equipment. In another embodiment, the operator can be verified as well as authorized to use welding equipment. In still another embodiment, the operator can be authorized to employ a welding sequence in which welding job sequencer component 704 utilizes to facilitate guiding the operator to perform a weld on a workpiece. In general, the input received can be used to verify an operator and/or authorize an operator to utilize welding equipment, welding sequence(s), and/or a combination thereof. It is to be appreciated and understood that the welding job sequencer component 704 can be substantially similar to the welding job sequencer component 302 (described above) as well as the welding job sequencer (described above).

By way of example and not limitation, the input can be data communicated from the operator or obtained from the operator, wherein such data can be verified by system 700 to ensure operator integrity (e.g., prevent unauthorized operators, verification of operator with credentials, and the like). For instance, the input can be at least one of a username, a password, employee identification, image identification, or a combination thereof. For example, the image identification can be a barcode, a Quick Response (QR) code, a portion of a graphic, a logo, a 3-dimensional (3D) barcode, among others. In an embodiment, an image can be displayed on a device for receipt to system 700 for authorization (e.g., device receives email at operator's work email account and email includes image that allows registration for a period of time). For instance, a unique logo can be submitted by an operator and registered as an identification to which system 700 verifies and corresponds to the operator. In such instance, the unique logo can be placed on equipment (e.g., glove, apron, jacket, visor, helmet, and the like) of the operator. In still another embodiment, an employee identification can be affixed to the operator's equipment, wherein register component 702 receives and/or collects such input in order to authorize such operator for welding equipment and/or welding sequence employment.

In still another embodiment, the input can be biometric data. By way of example, the biometric data can be a handprint, a fingerprint, a retinal scan of an eye, a portion of facial data of the operator, a height of the operator, a weight of the operator, body-shape of the operator, capacitance of operator based on body-mass index, among others. For instance, an operator can approach a welding work cell and register component 702 can receive biometric data such as, for instance, a handprint or palm print. Based on the biometric data, system 704 can authenticate the operator and identify at least one welding sequence via a welding sequence data store 706, wherein the authentication allows at least one of use of welding equipment within the welding work cell and/or use of the identified welding sequence. As discussed above, data store (here, welding sequence data store 706) can be, for example, either volatile memory or nonvolatile memory, or can include both volatile and nonvolatile memory. The data store (here, welding sequence data store 706) of system 700 is intended to comprise, without being limited to, these and other suitable types of memory. In addition, the data store can be a server, a database, a hard drive, a flash drive, an external hard drive, a portable hard drive, a cloud-based storage, a solid-state drive, and the like. It is to be appreciated that input data received or registered (discussed below) can be stored in a dedicated data store for such data, welding sequence data store, a remote data store, a cloud-based environment, a combination thereof, among others.

As discussed above, register component 702 can include any computing device and/or peripheral, among others. It is to be appreciated that any suitable device (e.g., smartphone, laptop, webcam, camera, digital device, portable electronic device, computing device, desktop, scanner, image grabber, barcode reader, and the like) that collects inputs described above is to be included in the subject disclosure. Moreover, register component 702 can be further configured to register input to an operator in which such input is used as a system authenticated input. The system authenticated input can be data to which later inputs are compared in order to authenticate or validate. It is to be appreciated that obtaining or collected system authenticated input can be referred to as registration of an operator.

System 700 allows registration and/or authorization to allow an operator to utilize one or more welding sequences to perform one or more welding operations for one or more workpieces. For instance, registration component 702 can authorize an operator to utilize more than one welding sequence. Moreover, registration component 702 can authorize an operator to employ a welding sequence on one or more workpieces or welding jobs. In other words, system 700 can be utilized to allow for a batch log in (e.g., registration and/or authorization) as well as a log in for each workpiece. For instance, system 700 can be used to allow an operator to log in for each part (e.g., workpiece, assembly of a workpiece(s), step or sequence in a welding sequence) and/or log in for a batch of parts (e.g., more than one part).

In an embodiment, the authorization of the operator is utilized as a condition to satisfy prior to access or use of a welding sequence via welding job sequencer component 704. For instance, a welding sequence can be utilized by an operator based on pre-defined criteria such as, but not limited to, training, experience, welding hours, welding courses completed, among others. In other words, welding job sequencer component 704 can restrict an operator from using a welding sequence based upon the operator being unauthorized. However, upon authorization of the operator, welding job sequencer component 704 identifies welding sequence(s) (via welding sequence data store 706) from which the operator can select and utilize to perform one or more welds.

It is to be appreciated that an operator authorization can be utilized in one or more environments. For instance, an operator can register in welding environment A and further submit input in a welding work cell in welding environment B for authorization. In other words, operator registration may originate at a first welding environment and authorization may be provided at a second welding environment. In still another embodiment, a registration environment can be used to which system authenticated data can be accessed or utilized to more than one welding environment. Moreover, welding sequences associated or authorized for use by an operator may extend across one or more welding environments. In an embodiment, a welding sequence may include an additional training or supervision before use in one environment compared to another.

In an example, a welding sequence can include a replenishment of a consumable. The welding sequence can be created or edited to include a replenishment of a consumable for at least one of a welding work cell, a welding equipment, among others. For instance, a replenishment of a consumable can be included with a welding sequence after a period of time, wherein the period of time is estimated based on the duration the welding equipment is used (e.g., estimate the use of consumables). Thus, a welding environment, welding system, and/or welding work cell can be evaluated in real time or from collected real time data and identify data to determine a replenishment of a consumable.

In another example, a welding sequence can include an inspection or a repair. The welding sequence can be created or edited to include an inspection request or a repair request based on a factor such as, but not limited to, a time, a duration, among others. A welding work cell can have a maintenance period for a particular time and if a welding sequence is created for such welding work cell, a repair or maintenance can be included with the created welding sequence. Thus, a welding environment, welding system, and/or welding work cell can be evaluated in real time or from collected real time data and identify data to determine inspections or repairs.

In another example, a welding sequence can include a pre-shift routine that is performed prior to a welding operation. For instance, a shift can be part of a scheduling of operators or employees, wherein the shift is a duration of time when operators are working. As an example, a shift can be from seven (7) am to three (3) pm. Based on gathered historic welding data or real time welding data, an estimation of welding time can be calculated to facilitate determining maintenance to perform on welding equipment. In an embodiment, at least one of gas flow, tip condition, tip replacement, nozzle inspection, nozzle replacement, among others can be included within a welding sequence based on the estimation of welding time.

Furthermore, it is to be appreciated and understood that register component 702 can be a stand-alone component (as depicted), incorporated into welding job sequencer component 704, incorporated into welding equipment (not shown), or a combination thereof. Additionally, welding job sequencer component 704 can be a stand-alone component (as depicted), incorporated into register component 704, incorporated into welding equipment (not shown), or a combination thereof. Further, welding sequence data store 706 can be a local data store, a remote data store, a cloud-based data store, a computing platform, and/or any other network or computing environment configuration discussed above in regards to the welding job sequencer component.

Figure 8:
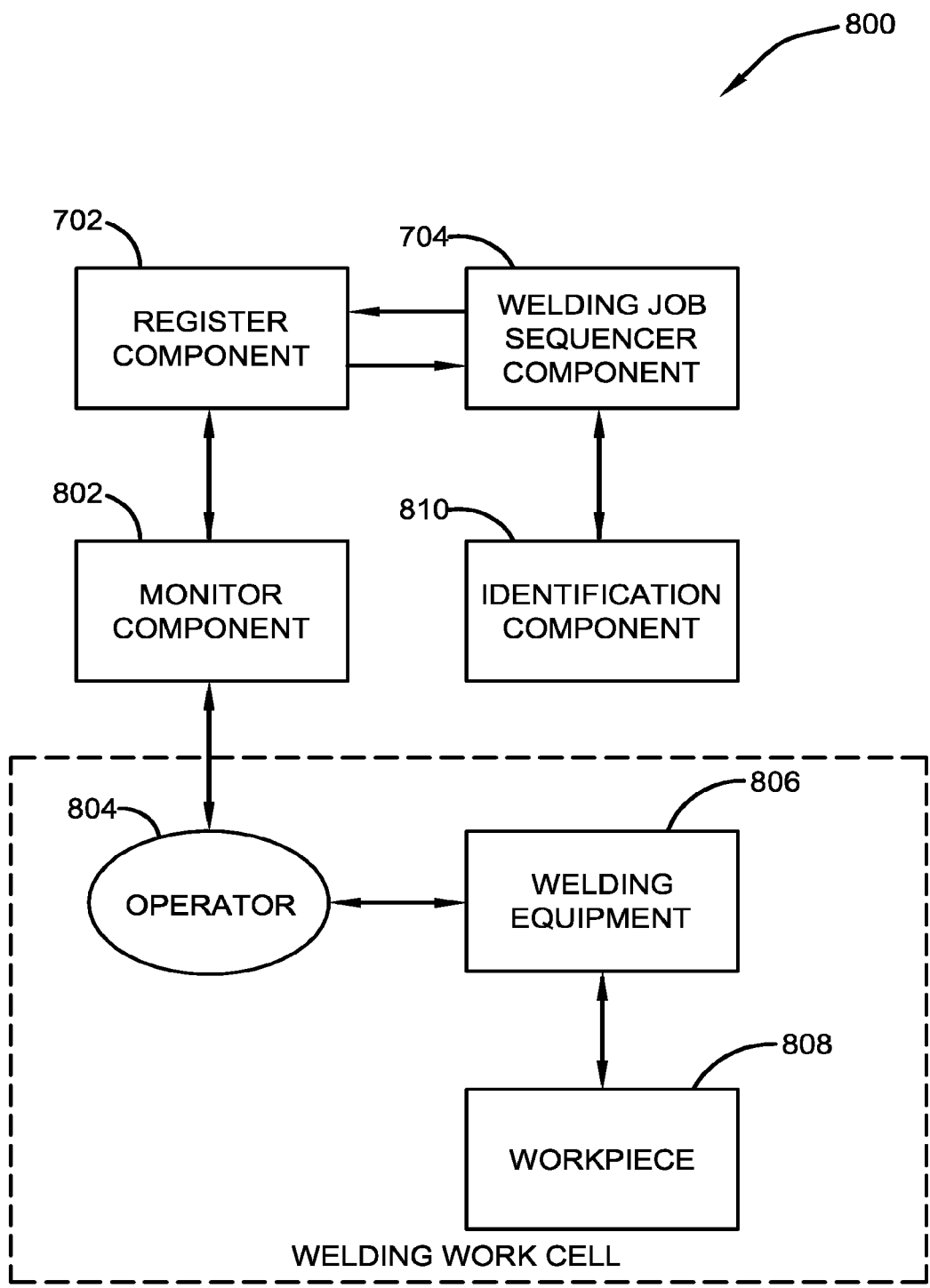
FIG. 8 is a block diagram illustrating a system that monitors fixture settings for a welding procedure prior to performing a welding procedure with a welding sequence.

FIG. 8 illustrates system 800 that monitors fixture settings for a welding procedure prior to performing a welding procedure with a welding sequence. System 800 further includes monitor component 802 that is configured to evaluate a portion of welding work cell (discussed above) to determine a location of a fixture for workpiece 808 prior to performing a weld utilizing a welding sequence. By way of example and not limitation, a fixture secures the workpiece from movement during the first weld or the second weld. For instance, a fixture can be a clamp, a temporary weld (e.g., a tack weld), among others. Monitor component 802 verifies a position and/or location of at least one fixture for workpiece 808, wherein the position and/or location corresponds to at least one of a specific welding sequence, a job, an assembly of the workpiece, and the like. In an embodiment, monitor component 802 provides real time monitoring of operator 804 and configuration of one or more fixtures. In another embodiment, monitor component 802 evaluates a location and/or position of one or more fixtures upon completion of operator's configuration.

Data relating to a fixture (e.g., position, location, number of fixtures, among others) can be referred to as fixture data. Fixture data can be included within a welding sequence or associated with a welding sequence. Thus, prior to employing a welding sequence, monitor component 802 can verify fixture data (e.g., position of fixture, number of fixtures, pressure required for each fixture, among others). In another embodiment, fixture data can be associated with workpiece 808, job, client, or assembly. In general, an identification of workpiece 808 and/or welding sequence can be used to determine fixture data, wherein performance of a weld can be dependent upon validation of fixture data for quality control.

System 800 further includes identification component 810 that is configured to determine a welding sequence for workpiece 808. Identification component 810 can collect or receive data from workpiece 808 and identify at least one welding sequence that includes welding procedures to perform thereon. In an embodiment, identification component 810 leverages a data store (not shown but discussed above in FIG. 7). In a particular example, a workpiece can include barcode data that is received and identification component 810 matches a welding sequence based on the identified workpiece (identified by a lookup of the barcode data). In another embodiment, identification component 810 selects at least one welding sequence based on an input from an operator (e.g., via registration component in FIG. 7). In another example, the welding sequence can be correlated or matched to workpiece 808 via an operator registration. Thus, a particular operator can be assigned specific welding sequences to perform for a duration of time and registration and/or authorization can enable identification component 810 to select a welding sequence to utilize for a welding operation. In still another embodiment, identification component 810 can evaluate at least one of workpiece 808 (e.g., orientation, size, dimensions, material, and the like), welding equipment 806 settings, and/or fixture data (e.g., location of fixture, size of fixture, and the like) to determine a welding sequence to implement for workpiece 808. For example, a camera or video device can be attached to operator equipment or within the welding work cell and collect data related to workpiece and/or welding operation performed, wherein such data collected allows identification component 810 to select a welding sequence that is used by welding job sequencer component 704. Moreover, such data can be utilized to train or set up welding job sequencer component 704.

Monitor component 802 can leverage, for instance, image data (e.g., camera data), position sensors on fixtures, pressure sensors on fixtures, workpiece orientation, among others. Based on the validation of the one or more fixtures, welding equipment 806 may be activated (if position and/or location of fixtures are verified) or remain deactivated (if position and/or location of fixtures are not in accordance with standards).

Figure 9:
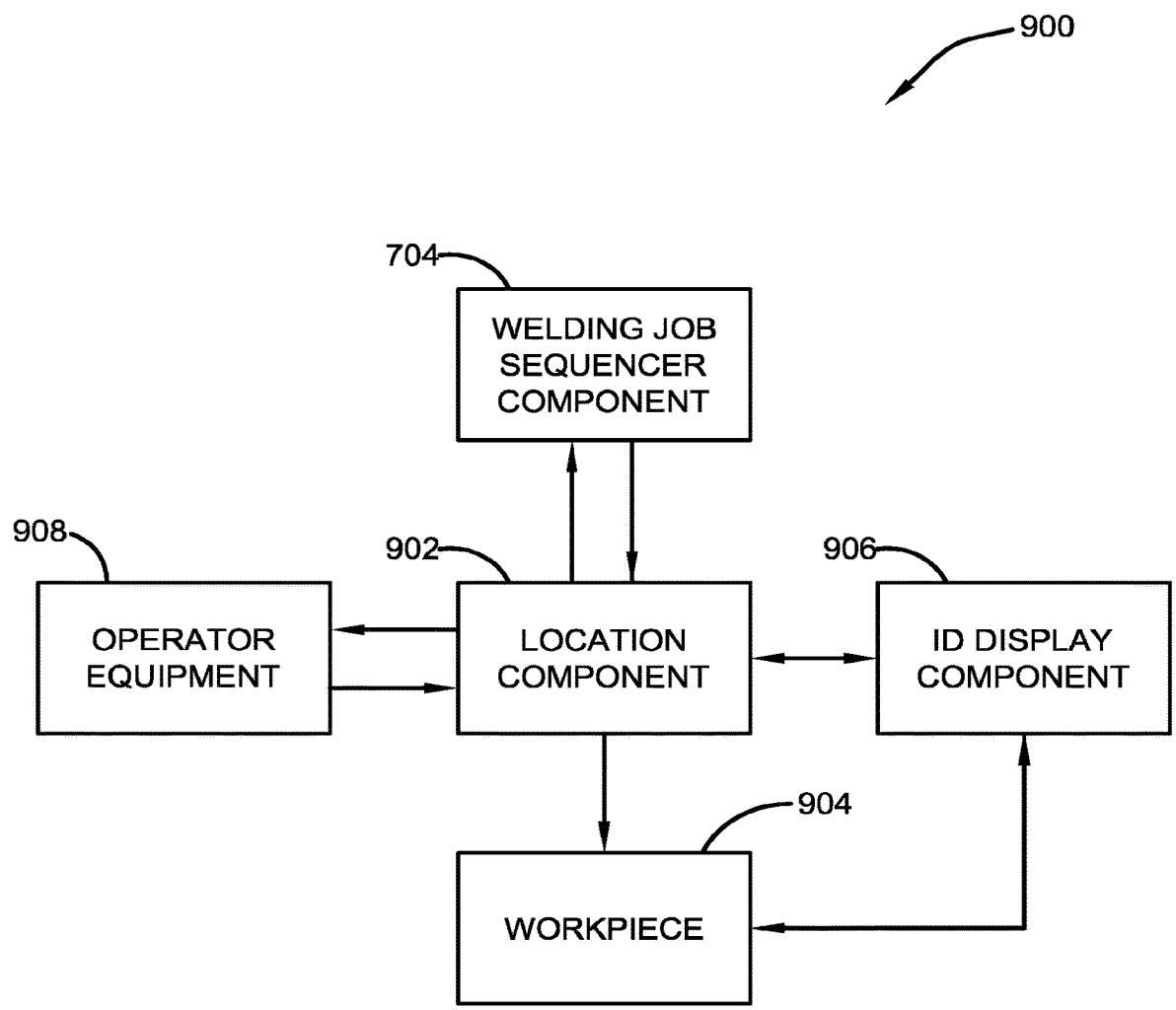
FIG. 9 is a block diagram illustrating a system that generates and provides data to an operator on where to perform a welding procedure on a workpiece.

FIG. 9 illustrates system 900 that generates and provides data to an operator on where to perform a welding procedure on a workpiece. System 900 includes location component 902 that is configured to provide information on a workpiece 904 for performing a weld using welding equipment and/or a welding sequence. In an embodiment, location component 902 can project a target on workpiece 904, wherein the target can be at least one of a simulated weld (e.g., an image of what the weld is to look like when performed on with the welding sequence) or a indicator (e.g., an image that indicates a location for where the weld is to be performed with the welding sequence). For instance, location component 902 can project a target (e.g., an image, a light, a hologram, and the like) onto workpiece 904 at a particular location to which a weld is to be performed, wherein the location is defined by the welding sequence that is to be utilized via welding job sequencer component 704. In another embodiment, the location can be provided as a separate portion of data that is used by the location component 902. Thus, the location can be determined for workpiece 904 with the welding sequence or, in the alternative, independent of the welding sequence.

Location component 902 can further generate a target (e.g., via a light, a hologram, an image, and the like) on operator equipment 908. For instance, the target can be generated and/or displayed onto a visor of an operator, a glass of a pair of glasses, among others. It is to be appreciated that the operator can selectively control whether the target is displayed or not displayed in order to minimize restriction of vision and/or improve safety. In another embodiment, location component 902 can interact with a video device that allows an operator to view workpiece 904 through the video device and have a target overlaid thereon via a display or viewfinder of the video device.

System 900 further includes ID display component 906 that is configured to project data onto workpiece 904 and/or onto a surface within a welding work cell, wherein the data relates to specify a welding operation being performed on workpiece 904. For instance, the data can be, but is not limited to, a job reference, a work order, a welding schedule, a barcode, a serial number, a reference identification, one or more numbers, one or more letters, a welding sequence identification, a client reference, and/or a combination thereof. In another embodiment, ID display component 906 can be configured to display additional information related to the one or more welding procedures performed such as, but not limited to, an operator identification, a timer illustrating a duration of time welding, a counter (e.g., counting a number of welds), a weld score (e.g., rating or score of welding performance), a date, a time, among others.

Figure 10:
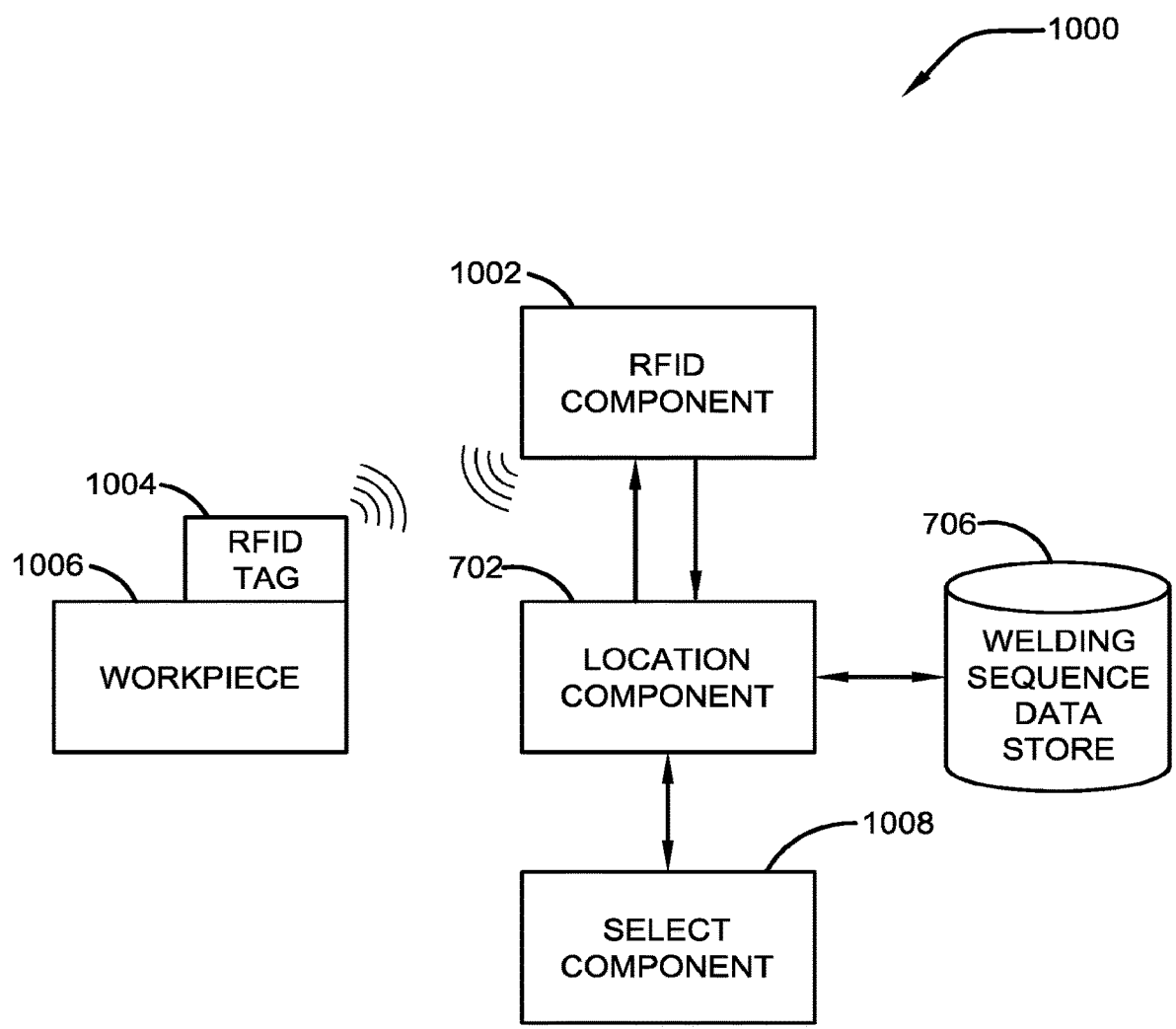
FIG. 10 is a block diagram illustrating a system that employs Radio Frequency Identification (RFID) to select a welding sequence to drive a welding procedure with a workpiece.

FIG. 10 illustrates system 1000 that employs Radio Frequency Identification (RFID) to select a welding sequence to drive a welding procedure with a workpiece. System 1000 includes Radio Frequency Identification (RFID) component 1002 (herein referred to as RFID component or RFID reader) that is configured to receive or collect wireless data from RFID tag 1004, wherein wireless data includes information related to at least one of workpiece 1006, job, work order, weld operation, welding sequence to use, among others. In an embodiment, RFID tag 1004 can be affixed or coupled to workpiece 1006. It is to be appreciated that the wireless data received can be used by select component 1008 to identify at least one welding sequence via welding sequence data store 706. Once identified, the welding sequence can be utilized by welding job sequencer component 702 to perform two or more welds without operator/ user intervention to configure welding equipment. In general, the wireless data received or collected from RFID tag 1004 allows select component 1008 to determine a welding sequence to use for a particular welding operation, workpiece, and/or assembly of a workpiece.

RFID tag 1004 can be an active tag (e.g., power source used to allow transmission from tag to reader) or a passive tag (e.g., a portion of a signal received from RFID reader or component 1002 is used to power transmission from the tag to RFID reader or component 1002). Moreover, it is to be appreciated that there can be any suitable number of RFID readers, corresponding sets of tags for each reader, and the like. RFID reader or component 1002 communicates wirelessly with at least one RFID tag 1004 based on a geographic range or distance therebetween. For instance, based on at least one of a frequency, power source (e.g., passive tag, active tag, amount of power from power source), among others, the geographic range or distance can vary. In any event, when the frequency and/or power source allow wireless communication between at least one tag and RFID reader or component 1002, data is communicated from at least one RFID tag to RFID reader or component 1002, wherein the data is information related to at least one of workpiece 1006, job, work order, weld operation, welding sequence to use, among others.

An RFID system (e.g., system 1000) consists of at least an RFID tag (e.g., RFID tag 1004) and an RFID transceiver (e.g., RFID component 1002). The RFID tag can contain an antenna that provides reception and/or transmission to radio frequency queries from the RFID transceiver. The RFID tag can be a small object, such as, for example, an adhesive sticker, a flexible label and integrated chip, etc. There are typically four different frequencies the RFID tags utilize: low frequency tags (between about 125 to 134 kilohertz), high frequency tags (about 13.56 megahertz), UHF tags (about 868 to 956 megahertz) and Microwave tags (about 2.45 gigahertz). In general, an RFID system can include multiple components: tags, tag readers (e.g., tag transceivers), tag writers, tag-programming stations, circulation readers, sorting equipment, tag inventory wands, among others.

Figure 11:
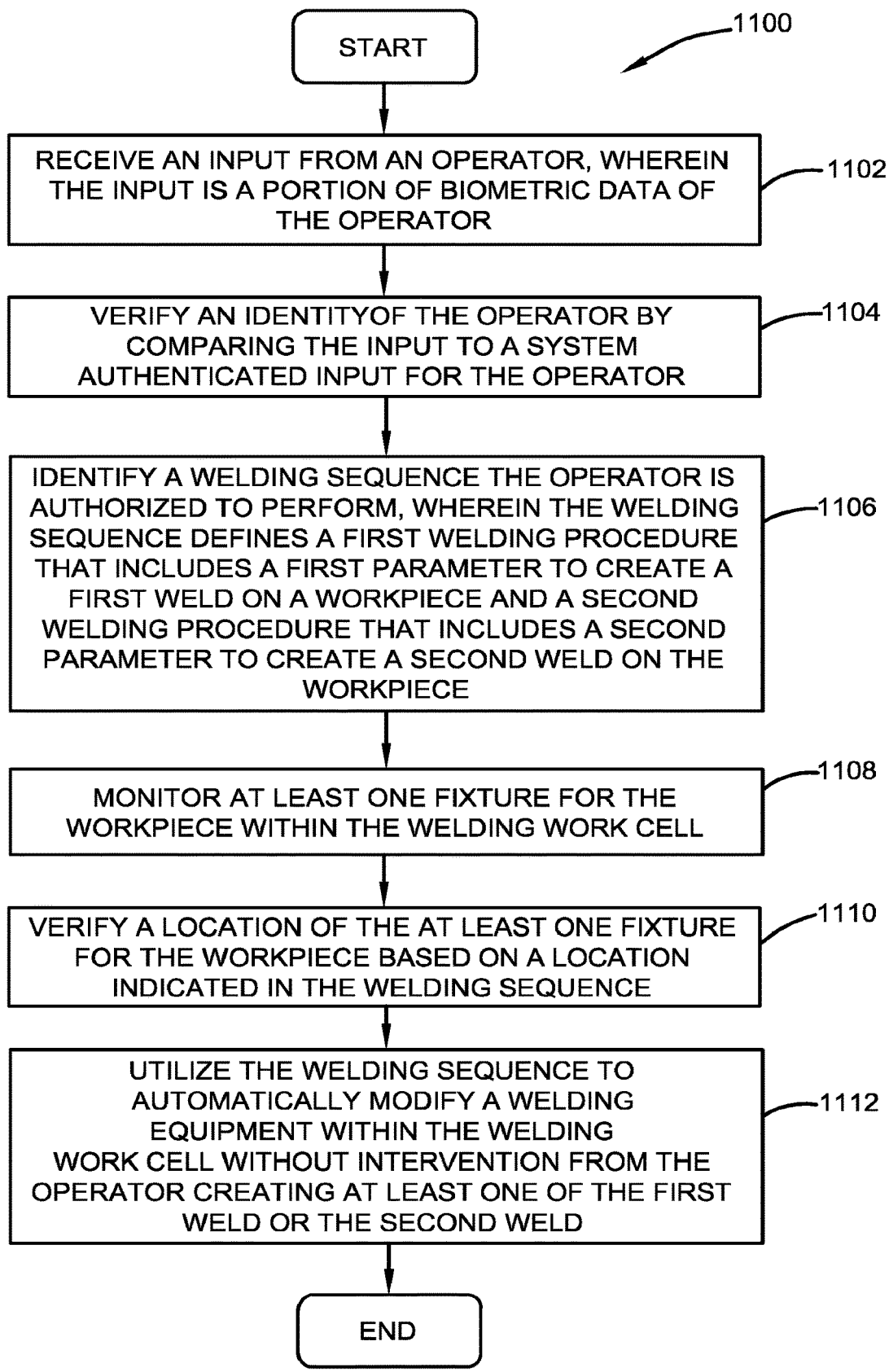
FIG. 11 is a flow diagram of registering an operator with a welding sequence in order to perform a weld on a workpiece.
Figure 12:
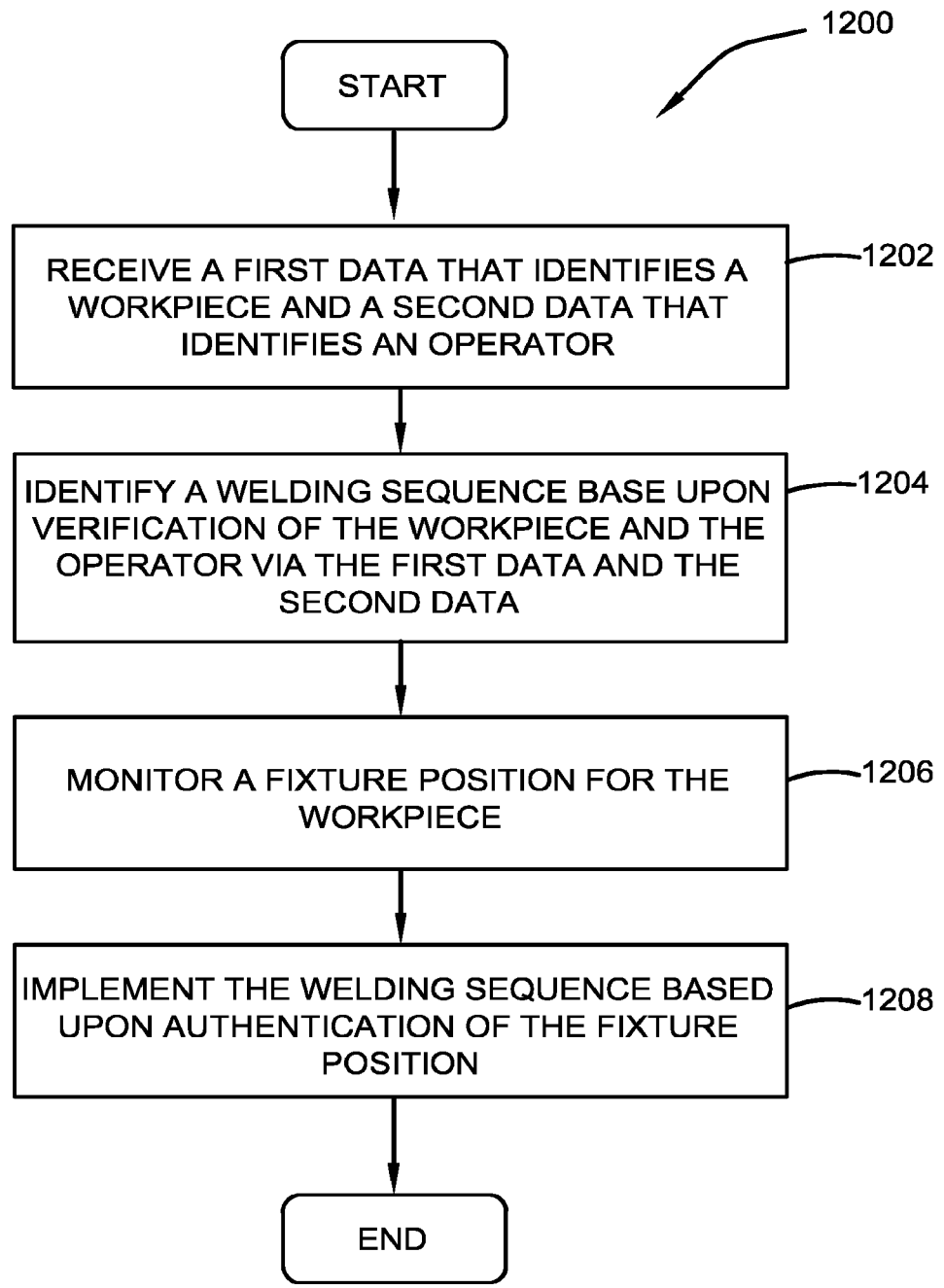
FIG. 12 is a flow diagram of verifying a fixture setting for a workpiece for a welding procedure and a welding sequence.

In view of the exemplary devices and elements described supra, methodologies that may be implemented in accordance with the disclosed subject matter will be better appreciated with reference to the flow charts and/or methodologies of FIGS. 11 and 12. The methodologies and/or flow diagrams are shown and described as a series of blocks, the claimed subject matter is not limited by the order of the blocks, as some blocks may occur in different orders and/or concurrently with other blocks from what is depicted and described herein. In an embodiment, a first input can be received prior to a second input (as described below). In another embodiment, a second input can be received prior to a first input. In an embodiment, the a first input and a second input can be received at substantially the same time. Moreover, not all illustrated blocks may be required to implement the methods and/or flow diagrams described hereinafter.

Sequentially, the following occurs as illustrated in the decision tree flow diagram 1100 of FIG. 11 which is a flow diagram 1100 that registers an operator with a welding sequence in order to perform a weld on a workpiece within a welding work cell. Methodology 1100 employs at least one pre-welding conditions that are evaluated prior to use of a welding sequence. An input from an operator is received, wherein the input is a portion of biometric data of the operator (reference block 1102). It is to be appreciated and understood that the input can be data other than biometric data such as, but not limited to, employee identification, username, password, image identification (e.g., barcode, QR code, graphic, logo, among others), a combination thereof, and the like. An identity of the operator is verified by comparing the input to a system authenticated input for the operator (reference block 1104). A welding sequence the operator is authorized to perform is identified, wherein the welding sequence defines a first welding procedure that includes a first parameter to create a first weld on a workpiece and a second welding procedure that includes a second parameter to create a second weld on the workpiece (reference block 1106). At least one fixture for the workpiece is monitored within the welding work cell (reference block 1108). A location of the at least one fixture for the workpiece is verified based on a location indicated in the welding sequence (reference block 1110). In another embodiment, the location is indicated by data associated with the identified welding sequence, the workpiece, a welding job, a client, a welding procedure, among others. The welding sequence is utilized to automatically modify a welding equipment within the welding work cell without intervention from the operator creating at least one of the first weld or the second weld (reference block 1112).

In an embodiment, method 1100 can further include receiving a wireless signal from a Radio Frequency Identification (RFID) tag associated with the workpiece and selecting the welding sequence for the workpiece based on the wireless signal. In the embodiment, method 1100 can further include projecting a weld location image onto at least one of an equipment of the operator or the workpiece, wherein the weld location image indicates where to perform at least one of the first weld or the second weld and projecting an identification image onto at least one of an equipment of the operator or the workpiece, wherein the identification image specifies the workpiece by at least one of a serial number, a number, a client, or a job reference.

The following occurs as illustrated in the flow diagram 1200 of FIG. 12. Flow diagram 1200 relates to verifying a fixture setting for a workpiece for a welding procedure and a welding sequence. A first data is received that identifies a workpiece and a second data is received that identifies an operator (reference block 1202). A welding sequence is identified based upon verification of the workpiece and the operator via the first data and the second data (reference block 1204). A fixture position for the workpiece is monitored (reference block 1206). The welding sequence is implemented based upon authentication of the fixture position (reference block 1208).

By way of example and not limitation, welding equipment (e.g., controller for a welder power source, wire feeder, welder power source, among others) can include one or more steps related to a particular welding process for a specific workpiece, wherein a step can include a respective setting or configuration for at least one welding equipment. For instance, a first workpiece can include steps A, B, C, and D based on welding parameters desired, the welding process used, and/or the workpiece. In another example, a second workpiece can include steps B, C, A, E, and F. With the employment of a welding sequence, the controller implementing the steps for the welding process via the welder power source and/or welding equipment can be managed and/or instructed. For instance, the welding sequence can indicate at least one of the following: which steps to perform, redo a step, skip a step, pause a sequence of steps, among others. Furthermore, a controller (e.g., or other suitable component) can control one or more welder power sources, parameters, welding schedules, among others associated with one or more welding processes, wherein each welding process can have a corresponding welding sequence(s).

In an embodiment, a welder system is provided that includes a weld score component that is configured to evaluate at least one of the first weld or the second weld performed on the workpiece based upon at least one of an image of the first weld or the second weld or a user inspection. In an embodiment, a welder system is provided that includes a check point component that is configured to monitor the creation of at least one of the first weld or the second weld in real time. In an embodiment, a welder system is provided in which a welding job sequencer component instructs an operator of the welding work cell to assemble the workpiece with the first welding procedure and the second welding procedure having two separate welding schedules.

In an embodiment, the first component is configured to identify the operator with a portion of biometric data. In the embodiment, the portion of biometric data is at least one of a handprint, a fingerprint, a retinal scan of an eye, a portion of facial data of the operator, a height of the operator, or a weight of the operator. In an embodiment, the first component identifies the operator by an image and the image is located on at least one of a helmet of the operator, a protective shield on a helmet, a glove, a welding gun, an identification badge, a welding jacket, a welding sleeve, a welding apron, or a pair of glasses. In the embodiment, the image is at least one of a barcode, an employee identification, a set of letters, a set of numbers, a graphic, a logo, a Quick Response (QR) code, or a three-dimensional (3D) barcode.

In an embodiment, a system can include a monitor component that is configured to detect a location of at least one fixture used with the workpiece within the welding work cell, wherein the at least one fixture secures the workpiece from movement during the first weld or the second weld and a monitor component that is configured to verify the location of the at least one fixture corresponds to a location indicated with the welding sequence. In the embodiment, the monitor component is at least one of a pressure sensor, an image capture device, or a video device. In the embodiment, the monitor component detects the location of the at least one fixture based on an orientation of the workpiece within the welding cell.

In an embodiment, a system can include a location component that is configured to navigate a weld location for the workpiece to the operator based upon the welding sequence. In the embodiment, the location component projects the weld location on at least one of the workpiece or an equipment of the operator. In the embodiment, the equipment of the operator is at least one of a helmet, a visor, a lens on a pair of glasses, or a display on a glove.

In an embodiment, a system can include a Radio Frequency Identification (RFID) component that is configured to receive a wireless signal from an RFID tag affixed to the workpiece, wherein the wireless signal includes data to identify the workpiece and a select component that is configured to identify the welding sequence based on the identified workpiece.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A method of welding in a welding work cell, comprising:
   receiving an input from an operator prior to the operator performing one or more welds;
   verifying an identity of the operator by comparing the input to a system authenticated input for the operator;
   identifying a welding sequence the operator is authorized to perform, wherein the welding sequence defines one or more welding procedures that include one or more parameters to create said one or more welds on a workpiece; and
   employing the welding sequence for the welding work cell to perform said one or more welds to assemble the workpiece by automatically adjusting a setting on a welding equipment within the welding work cell.

2. The method of claim 1, further comprising receiving a wireless signal from a Radio Frequency Identification (RFID) tag associated with the workpiece, wherein the wireless signal includes at least a portion of data that is used to identify the welding sequence for the workpiece.

3. The method of claim 1, further comprising:
   monitoring at least one fixture for the workpiece within the welding work cell; and
   verifying a location of the at least one fixture for the workpiece based on a location indicated in the welding sequence.

4. The method of claim 1, further comprising projecting a weld location image onto at least one of an equipment of the operator or the workpiece, wherein the weld location image indicates where to perform said one or more welds.

5. The method of claim 1, further comprising projecting an identification image onto at least one of an equipment of the operator or the workpiece, wherein the identification image specifies the workpiece by at least one of a serial number, a number, a client, and a job reference.

6. The method of claim 1, wherein the input comprises a portion of biometric data of the operator.

7. The method of claim 6, wherein the portion of biometric data is at least one of a handprint, a fingerprint, a retinal scan of an eye, a portion of facial data of the operator, a height of the operator, or a weight of the operator.

8. The method of claim 1, wherein the input identifies the operator by an image and the image is located on at least one of a helmet of the operator, a protective shield on a helmet, a glove, a welding gun, an identification badge, a welding jacket, a welding sleeve, a welding apron, and a pair of glasses.

9. A method of welding in a welding work cell, comprising:
   receiving an input from an operator prior to the operator performing one or more welds;
   verifying an identity of the operator by comparing the input to a system authenticated input for the operator;
   identifying both welding equipment that the operator is authorized to use and a welding sequence that the operator is authorized to perform, wherein the welding sequence defines one or more welding procedures that include one or more parameters to create said one or more welds on a workpiece using the welding equipment; and
   employing the welding sequence for the welding work cell to perform said one or more welds to assemble the workpiece by automatically adjusting a setting on the welding equipment within the welding work cell.

10. The method of claim 9, further comprising receiving a wireless signal from a Radio Frequency Identification (RFID) tag associated with the workpiece, wherein the wireless signal includes at least a portion of data that is used to identify the welding sequence for the workpiece.

11. The method of claim 9, further comprising:
    monitoring at least one fixture for the workpiece within the welding work cell; and
    verifying a location of the at least one fixture for the workpiece based on a location indicated in the welding sequence.

12. The method of claim 9, further comprising projecting a weld location image onto at least one of an equipment of the operator or the workpiece, wherein the weld location image indicates where to perform said one or more welds.

13. The method of claim 9, further comprising projecting an identification image onto at least one of an equipment of the operator or the workpiece, wherein the identification image specifies the workpiece by at least one of a serial number, a number, a client, and a job reference.

14. The method of claim 9, wherein the input comprises a portion of biometric data of the operator.

15. The method of claim 14, wherein the portion of biometric data is at least one of a handprint, a fingerprint, a retinal scan of an eye, a portion of facial data of the operator, a height of the operator, or a weight of the operator.

16. The method of claim 9, wherein the input identifies the operator by an image and the image is located on at least one of a helmet of the operator, a protective shield on a helmet, a glove, a welding gun, an identification badge, a welding jacket, a welding sleeve, a welding apron, and a pair of glasses.

17. A method of welding in a welding work cell, comprising:
    receiving an input from an operator prior to the operator performing one or more welds;
    verifying an identity of the operator by comparing the input to a system authenticated input for the operator;
    identifying a plurality of welding sequences that the operator is authorized to perform;
    receiving a welding sequence selection by the operator and selected from said plurality of welding sequences that the operator is authorized to perform, and wherein the selected welding sequence defines one or more welding procedures that include one or more parameters to create said one or more welds on a workpiece; and
    employing the selected welding sequence for the welding work cell to perform said one or more welds to assemble the workpiece by automatically adjusting a setting on a welding equipment within the welding work cell.

19. The method of claim 17, further comprising projecting a weld location image onto at least one of an equipment of the operator or the workpiece, wherein the weld location image indicates where to perform said one or more welds.

19. The method of claim 17, further comprising projecting an identification image onto at least one of an equipment of the operator or the workpiece, wherein the identification image specifies the workpiece by at least one of a serial number, a number, a client, and a job reference.

* * * * *